(12) United States Patent
Brack et al.

(10) Patent No.: US 8,401,890 B1
(45) Date of Patent: Mar. 19, 2013

(54) SYSTEM AND METHOD FOR IDENTIFYING ONE OR MORE BUSINESS TRANSACTIONS AND/OR BUSINESS SYSTEMS

(75) Inventors: Randall Brack, Overland Park, KS (US); Michaela R. Fite, Olathe, KS (US); Randy R. Herigon, Kansas City, MO (US); Charles L. Micklavzina, Overland Park, KS (US); Jerry W. Tally, Lenexa, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1498 days.

(21) Appl. No.: 11/321,506

(22) Filed: Dec. 29, 2005

(51) Int. Cl.
*G06Q 10/00* (2006.01)
(52) U.S. Cl. .......................................... 705/7.36
(58) Field of Classification Search .............. 705/7, 7.36
See application file for complete search history.

(56) References Cited

U.S. PATENT DOCUMENTS

| | | | |
|---|---|---|---|
| 4,429,385 A | 1/1984 | Cichelli et al. | |
| 5,815,638 A | 9/1998 | Lenz et al. | |
| 6,073,107 A | 6/2000 | Minkiewicz et al. | |
| 6,219,653 B1 | 4/2001 | O'Neill et al. | |
| 6,418,448 B1 | 7/2002 | Sarkar | |
| 6,550,053 B1 | 4/2003 | Muckley | |
| 6,658,643 B1 | 12/2003 | Bera | |
| 6,715,130 B1 | 3/2004 | Eiche et al. | |
| 6,810,392 B1 | 10/2004 | Piggott | |
| 6,938,007 B1 | 8/2005 | Lulianello et al. | |
| 7,051,036 B2 * | 5/2006 | Rosnow et al. | 707/102 |
| 7,321,895 B2 | 1/2008 | Dettinger et al. | |
| 7,526,487 B1 | 4/2009 | Bobbitt et al. | |
| 2002/0059512 A1* | 5/2002 | Desjardins | 713/1 |
| 2003/0110186 A1 | 6/2003 | Markowski et al. | |
| 2004/0003369 A1 | 1/2004 | Gonos | |
| 2004/0220910 A1 | 11/2004 | Zang et al. | |
| 2005/0216320 A1* | 9/2005 | Hattaway | 705/7 |
| 2006/0136489 A1 | 6/2006 | Thome et al. | |
| 2006/0161884 A1* | 7/2006 | Lubrecht et al. | 717/104 |
| 2007/0112945 A1* | 5/2007 | Brown et al. | 709/223 |
| 2007/0276674 A1* | 11/2007 | Hemmat | 705/1 |

OTHER PUBLICATIONS

Srinivasan, Lavanya, et al., "Function Point Analysis System and Method," filed Oct. 7, 2004, U.S. Appl. No. 10/960,878, Specification (28 pgs.) and Drawings (4 sheets).

Srinivasan, Lavanya, et al., "Enhanced Function Point Analysis," filed Jul. 29, 2005, U.S. Appl. No. 11/193,608, Specification (30 pgs.) and Drawings (4 sheets).

Brack, Randall, et al., "System and Method for Determining the Level of Effort for a Project," filed Dec. 29, 2005, U.S. Appl. No. 11/321,380, Specification (40 pgs.) and Drawings (17 sheets).

Akram, Abdul G., et al., Productivity Measurement and Management Tool, U.S. Appl. No. 10/867,074, filed Jun. 14, 2004.

Antoniol, et al., "A Function Point-Like Measure for Object-Oriented Software", Empirical Software Engineering, vol. 4, No. 3, pp. 263-287, 2001.

Meli, Roberto, "Early and Extended Function Point: A Method for Function Points estimation," IFPUG, Fall Conference, Sep. 15-19, 1997, pp. 1-11.

(Continued)

*Primary Examiner* — Andre Boyce

(57) ABSTRACT

A system for identifying one or more business transactions and one or more business systems is provided. The system includes a consolidated logical database comprising an information domain hierarchy comprising a set comprising one or more defined data requirement elements. The system includes a physical database, comprising one or more business transactions. An identification routine is used to select a defined data requirement element to identify the business transaction.

9 Claims, 17 Drawing Sheets

OTHER PUBLICATIONS

Software Composition Technologies, "Function Point FAQ, Frequently Asked Questions (and Answers) Regarding Function Point Analysis," http://ourworld.compserve.com/homepages/softcomp/fpfaq.htm, May 28, 2004, pp. 1-30.

Uemura, "Function-point Analysis Using Design Specifications Based on the Unified Modelling Language", Journal of Software Maintenance and Evolution: Research and Practice, vol. 13, Issue 4, pp. 22-243 (Aug. 2001).

Embarcadero Technologies, "ER/Studio 7.0 New Features Guide," Embarcadero Technologies, Inc., Published Oct. 20, 2005, pp. 1-19.

Office Action dated Aug. 13, 2010, 15 pages, U.S. Appl. No. 11/321,380, filed Dec. 29, 2005.

Office Action dated Mar. 15, 2010, 22 pages, U.S. Appl. No. 11/321,380, filed Dec. 29, 2005.

Shoval, Peretz, et al., "Combining Function Points Software Estimation Model With ADISSA Methodology for System Analysis and Design", Information System Program, Department of Industrial Engineering and Management, Ben-Gurion University of the Negev, Beer-Sheva 84105, Israel, Feb. 1997.

Office Action dated Dec. 7, 2009, 8 pages, U.S. Appl. No. 11/321,380, filed Dec. 29, 2005.

Ahn, Yunsik, et al., "The Software Maintenance Project Effort Estimation Model Based on Function Points", Kyungwon College, Sungnam, Kyungki-Do, Seoul, Korea; Journal of Software Maintenance and Evolution: Research and Practice, vol. 15, pp. 71-85.

Albrecht, Allan J., "Measuring Application Development Productivity", IBM Applications Development Symposium, Monterey, California, 1979.

Antoniol, et al., "Adapting Function Points to Object Oriented Information System", Advanced Information Systems Engineering, CAISE'98, pp. 59-76, Monterey, California, 2002.

Bashir, Hamdi A., et al., "Estimating Effort and Time for Design Projects", Department of Mechanical and Industrial Engineering, Concordia University, Montreal, Canada, 2002.

CRC Press LLC, "Project Planning and Cost Estimating", http://gislab.info/docs/books/aerial-mapping/cr1557_17.pdf, Chapter 17, 2002.

Kemerer, Chris F., et al., "Improving the Reliability of Function Point Measurement: An Empirical Study", IEEE Transactions on Software Engineering, 18(11), 1011-1024, 1992.

SAP AG, "Project Estimator", Release 4.6C, 2001; http://help.sap.com/printdocu/core/print46c/en/data/pdf/SVASAPE/SVASAPE_01.pdf.

Office Action dated Oct. 1, 2012, U.S. Appl. No. 11/321,380, filed on Dec. 29, 2005.

* cited by examiner

Data Driven Approach Prototype [DD428-Wireless Credit Interface Replacement]

File  Project  Reports  Admin  Help

Project Requirements | Data Requirements Map | Report |
Requirement

| | |
|---|---|
| Concept Number | 19299 |
| Funding Business Unit | |
| Fiscal Status | |
| IT Working Status | |

| | |
|---|---|
| Project Status | |
| Business Status | |
| Customer Want Date | 3/28/2004 |
| Release | JAN06MAJ |

— 872
800 —
110 —

Business Requirements

BR7 Solution must identify shell accounts prior to running the credit check
BR8 Solution must identify PCS customer accounts prior to running credit check
BR8 1 Solution must identify existing PCS customer accounts prior to running credit check
BR 9 If customer information is identified in BR7, BR8 or BR8 1, the solution will prevent customer information from being sent to Lightbridge for a credit check
BR10 The solution should not result in an increase in call handle time for Lightbridge call center analysts (current SLA = 150 seconds)
BR11 Replace front end used by Lightbridge contact center to our web based center
BR12 Customized translations for user groups - example: LTD would need to be able to do both credit checks and activations while Lightbridge would only be able to do credit checks
BR13 Any and all data processed needs to be stored in a database specific to this application
BR14 Daily data feed for reporting on credit aps run through the application
BR15 Business unit(s) need access to back office administration tool for user activations and deactivations
BR16 Potential need for automated feeds to other systems (real time or batch)
BR17 Application must provide system support communications to user base ie: system status on each screen in application
BR18 Application/processing availability and support must be 24x7
BR19 User Profile needs to dictate duration of sessions: call center advocate logs in and remains logged in until advocate logs off, retail location would end session after each transaction
BR20 Capability to define time lapse and account status to determine if new credit check is required
BR21 PLEASE LOE SEPARATELY Capability to provide contingency processing for system outages either by redundancy or another ITS suggested solution

| Add | New | Delete | Save |
|---|---|---|---|

Project Requirements

| Requirement Text | Option A | Option B | Option C | Option D | Option E | Option F | Option G | Option H | Option I |
|---|---|---|---|---|---|---|---|---|---|
| BR1 Need the capability to provide an internally developed credit scoring solution whic | ☑ | ☐ | ☐ | ☐ | ☐ | ☐ | ☐ | ☐ | ☐ |
| BR7 Need the capability to identify shell accounts prior to running the credit check | ☑ | ☐ | ☐ | ☐ | ☐ | ☐ | ☐ | ☐ | ☐ |
| BR8 Need the capability to identify PCS write off accounts prior to running the credit c | ☑ | ☐ | ☐ | ☐ | ☐ | ☐ | ☐ | ☐ | ☐ |
| BR8 1 Need the capability to identify existing PCS customer accounts prior to running | ☐ | ☐ | ☑ | ☐ | ☐ | ☐ | ☐ | ☐ | ☐ |
| BR21 PLEASE LOE SEPARATELY Capability to provide contingency processing for syst | ☑ | ☐ | ☐ | ☐ | ☐ | ☐ | ☐ | ☐ | ☐ |
| The capability to add a new requirement to the credit scoring list | | | | | | | | | |

SYSTEM AND METHOD FOR IDENTIFYING ONE OR MORE BUSINESS TRANSACTIONS AND/OR BUSINESS SYSTEMS

CROSS-REFERENCE TO RELATED APPLICATIONS

This application includes subject matter similar to U.S. patent application Ser. No. 10/960,878, filed Oct. 7, 2004 and entitled "Function Point Analysis System and Method", and U.S. patent application Ser. No. 11/193,608, filed on Jul. 29, 2005 and entitled "Enhanced Function Point Analysis", and U.S. patent application Ser. No. 11/321,380 filed on Dec. 29, 2005 and entitled "System and Method for Determining the Level of Effort for a Project", all of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is generally directed to estimating costs for planning a project, and more particularly, but not by way of limitation, to predicting the level of effort required to complete a project.

BACKGROUND OF THE INVENTION

Generally, it is desirable to complete development projects, such as software development projects, on time and within the budget allocated to complete the projects. Accurately estimating the level of effort (LOE), or man-hours, needed to complete a project contributes towards realistic project scheduling and project budgeting. Without an accurate LOE estimate for the project, for example, too many or too few developers may be applied to the project and the project may be delivered late and/or over budget. By comparing an estimated LOE generated before a project commences with an actual LOE measured during or after a project, an enterprise can keep track of the budget and schedule of a project.

Various methods of estimating the LOE needed to complete a project have been employed with varying degrees of success. One of these, function point analysis, involves identifying and counting functionalities or function points to be delivered by a project. The function points can be assigned complexity ratings that reflect the amount of effort needed to achieve the specified functionality. Typically, the more function points to be delivered and the greater the complexity of the function points, the greater the LOE needed to complete the project.

SUMMARY OF THE INVENTION

According to one embodiment, a system for identifying one or more business transactions and one or more business systems is provided. The system includes a consolidated logical database comprising an information domain hierarchy comprising a set comprising one or more defined data requirement elements. The system includes a physical database, comprising one or more business transactions. An identification routine is used to select a defined data requirement element to identify the business transaction.

According to another embodiment, a method is provided for identifying at least one of a business transaction and a business system. The method includes employing a computer system to identify at least one of one or more business transactions and one or more business systems in an organization associated with one or more defined data requirement elements selected from a project.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIGS. 6-16 provide exemplary depictions of a graphical user interface of an exemplary system.

NOTATION AND NOMENCLATURE

Figure 1:
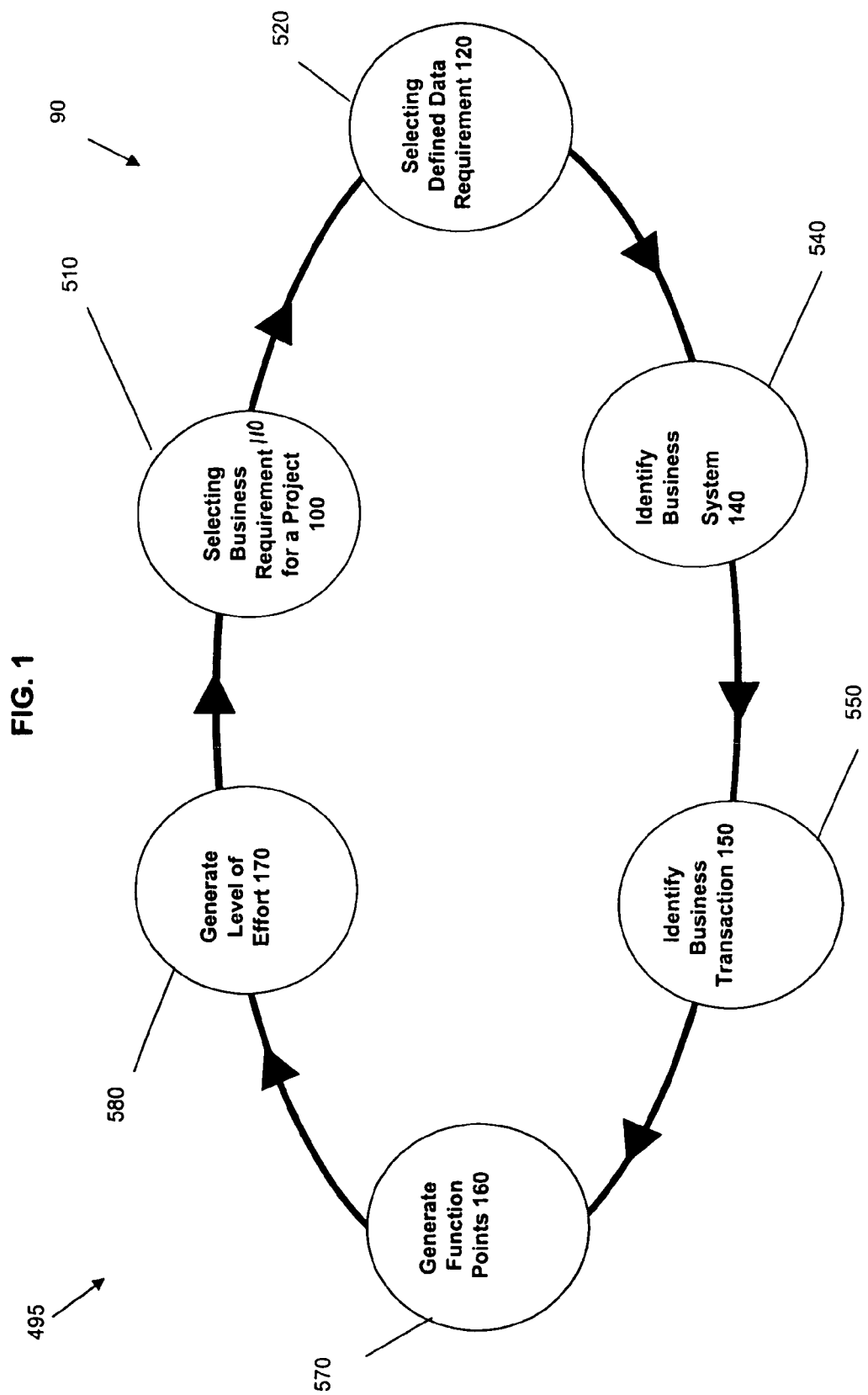
FIG. 1 is an exemplary mode of operation of one embodiment of a system.

Also in the detailed description and claims which follow, the terms "including" and "comprising" are used in an open-ended fashion, and thus should be interpreted to mean "including, but not limited to . . . ".

The term "couple" or "couples" is intended to mean either an indirect or direct electrical, wireline communicative, or wireless communicative connection. Thus, if a first device couples to a second device, that connection may be through a direct connection, or through an indirect connection via other devices and connections. Items shown or discussed as directly coupled or communicating with each other may be coupled through some interface or device, such that the items may no longer be considered directly coupled to each but may still be indirectly coupled and in communication, whether electrically, mechanically, or otherwise, with one another.

The term "defined data requirement element" refers to or represents a fact, which is a non-calculated piece of information, or a value, which is calculated information from at least one of one or more facts and one or more values, stored in a database.

The term "business transaction" or "application" refers to an operation on at least one of a fact and a value, or a set of at least one of a fact and a value.

The term "business requirement" refers to one or more business transactions that are generally considered desired to implement a project.

The term "physical database" refers to a database including one or more interface attributes, which is at least one of a fact and a value, utilized by at least one of one or more business systems and one or more business transactions in an organization. The physical database can be organized in an operational hierarchy, including according to business systems and business transactions used by at least one of those business systems.

The term "consolidated logical database" refers to a database including one or more defined data requirement elements that represent unique identifiers for one or more interface attributes in a physical database and organized in a hierarchy of information by content and relationship.

The term "business system" refers to a system or function in an organization that has responsibility, e.g. the operation, maintenance or purchase, of one or more business transactions or applications.

The term "organization" refers to a body of persons organized for at least one specific purpose, and includes businesses, clubs, societies, associations, and unions.

The term "business group" refers to a body of persons organized for at least one specific purpose within an organization, i.e. a business group is a subpart of an organization.

The term "business" as used herein is not limited to businesses, but can include, e.g., clubs, societies, associations, and unions.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

One exemplary system and method uses data analysis to determine the level of effort by allowing a user to select one or more business requirements for a project from a database. The system can include selecting the one or more business requirements for the project from the database, and then selecting one or more defined data requirement elements from a directory for each business requirement. Each defined data requirement element corresponds to one or more interface attributes utilized by one or more business systems and transactions in an organization. After selection of the elements, an analysis via a computer system can be conducted to determine the business systems and their underlying business transactions that utilize the corresponding interface attributes. Thus, affected business transactions and/or business systems may be more readily identified. Also from this analysis, one can categorize the existing business system and/or business transaction that utilizes the interface attributes, and thus the impact that the project will have on existing business systems and business transactions. Once that is done, the computer can generate function points that may be used to generate the level of effort required to complete the project.

An overview of one exemplary mode of operation 495 of a system 90 is depicted in FIG. 1. In this mode, a user selects one or more business requirements 110 from a directory for a project 100 at point 510. Afterwards, the user selects one or more defined data requirement elements 120 for each business requirement 110 at point 520. Next, employing a computer system 1380 as hereinafter described, each defined data requirement elements 120 can be analyzed to identify one or more business systems 140 at point 540 and one or more business transactions 150 at point 550. That being done, employing the computer system 1380 again can generate one or more function points 160 at point 570, and then generate the level of effort from the generated function points 170 at point 580. This mode permits a user to get an initial cost estimate for the project 100, and then optionally repeat the analysis if a variation of the project 100 or another project 100 is desired to be analyzed.

Moreover, the system can provide a clear analysis for determining data requirements, system impacts, application program interface (API) impacts, database impacts and associated dependency and synergies. This information can provide an estimated cost based on function points, which can be based on business system interdependencies between functions performed by an organization. This system may be desirable because it generally maximizes the opportunity for data and process sharing, which can result in a streamlined systems environment. As an example, a desirable sequence may recommend construction of "Product Management" and "Customer Management" systems before an "Agreement Management" system that sells specific products to specific customers. If constructed in this sequence, the already built product and customer data structures could be used by the Agreement Management system, rather than the Agreement Management system having to create its own redundant product and customer data. Often, business-driven priorities may sometimes lead to a deviation from this desired sequence. However, the availability of this desired sequence due to the present system may allow management to make better informed decisions for shifting project sequences, which can be known early in the project development. In fact, cost/benefit analyses, which balance sequence versus priority, can be undertaken to determine a desired project prioritization. The system can also provide information of the potential harmful impacts on existing business systems, and a quantification of such an impact to provide a cost before proceeding with the project. Moreover, the impacted business groups can be identified early in the process, and the people within these groups can be contacted to receive their input on the project.

In addition, the system can provide relatively rapid comparison of a project's data models/structures against a consolidated logical model database to relatively quickly assess how well the project's data models/structures meet the organization's data needs.

Moreover, the present system provides one or more defined data requirement elements that uniformly describe stored data throughout an organization. Thus, this uniformity can facilitate development of a common language (and understanding) amongst different business groups because the data model is developed, and approved, from an organizational-wide perspective. As such, new employees can learn the organization's operation more quickly through analysis of selected portions of the data model. As such, they can more easily gain a general understanding of what the organization does and formulate specific questions to increase the depth of their knowledge. In addition, having a central repository of data protects the organization should people leave and take valuable and non-shared information with them.

Furthermore, using the data model can highlight the redundancy of data within existing operational data structures by analyzing how many interface attributes correspond to a defined data requirement element. This information can be used to initiate projects aimed at eliminating the redundancy, and where possible, to incrementally improve the quality and integrity of existing interface attributes by reducing data complexity.

Also, using the data model of the system can highlight the redundancy of functionality within existing business transactions. This information can be used to initiate projects aimed at consolidating the business transactions within a single business system, and where possible, to incrementally improve the quality and lower the cost of maintaining the existing business systems.

Moreover, using the data model can depict the business transactions or applications performed by a business system. Redundancies of business systems may be uncovered and result in the initiation of business process reengineering efforts or organizational restructuring to improve the organizational efficiency.

In addition, using the data model can inventory currently used technical components, e.g. business transactions or applications within the organization (e.g., database management software (DBMS), operating systems, programming languages, application development tools, query tools, etc.). This information may identify the use of multiple business transactions or applications within the same class, and thus, may provide the opportunity to optimize, by eliminating unnecessary applications (e.g., upgrades), maintenance (e.g., application fixes), training, and support (e.g., monitoring) costs.

Furthermore, using the data model can show the data used by the business transactions and applications performed within the organization. Using this knowledge can identify "clusters" of business transactions and applications that act on similar data, and thus are candidates to be implemented within the same business system. It can also be used to draw attention to processes that should probably not be implemented within the same system due to a lack of synergy.

Moreover, using the data model may provide an integrated, overall view of an organization's data. This integrated view may be used to design existing business systems so cross-application information requirements can be delivered quickly and accurately. For example, the ability to integrate shipment, invoice, and claims data from different business systems may expedite the delivery of that information by the organization. In addition, having an overall, integrated view of an organization's data facilitates the integration of another organization's data into the data model because the new data can be "mapped" into the data model, as opposed to directly entered into physical tables. As a result, integration conflicts and subsequent business impacts can be identified and understood relatively more rapidly. Similarly, packaged (purchased) applications can be assessed for "fit" within the data model.

Figure 2:
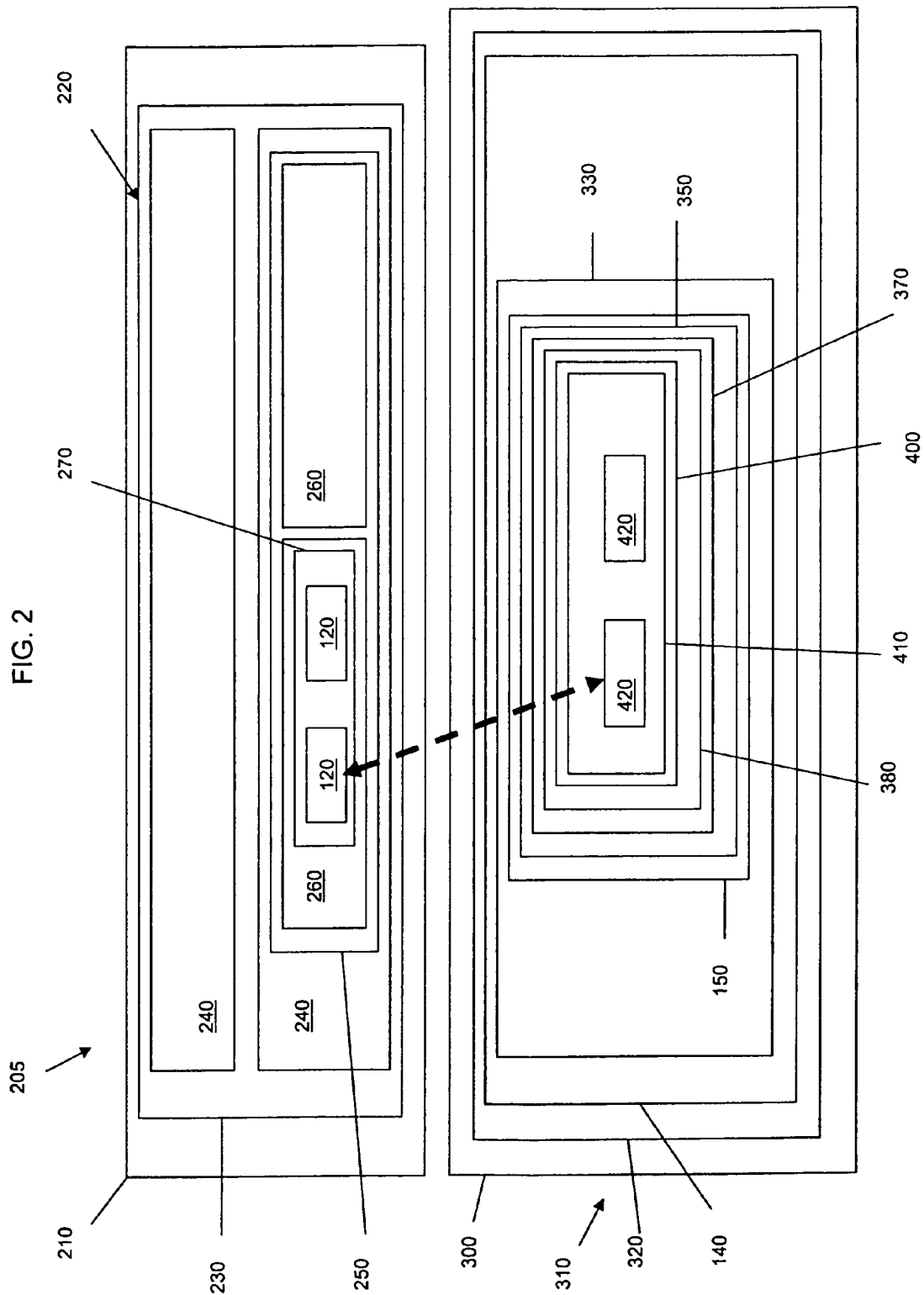
FIG. 2 is a schematic diagram of an exemplary database of a system.

Referring to FIG. 2, an exemplary data model 205 is schematically depicted. The data model 205 can include a consolidated logical database 210 and a physical database 300, and desirably contains all data in an organization, and is regularly updated to keep the data current.

The consolidated logical database 210 can include an informational domain hierarchy 220, which generally includes grouping of information in sets based on content and relationship with other information within the set. The consolidated logical database 210 can include any number of sets. One desired consolidated logical database 210 can further include a first set 230 including one or more subject area categories 240; a second set 250, which is a subset of the first set 230, and can further include one or more entity categories 260; and a third set 270, which is a subset of the second set 250, and can further include one or more defined data requirement elements 120. Although only one or two subject area categories 240, entity categories 260, or defined data requirement elements 120 in sets 230, 250, and 270 are depicted, it should be understood that the consolidated logical database 210 can include a vast number of subject area categories 240, entity categories 260 and defined data requirement elements 120 within each set. Moreover, each subject area category 240 and entity category 260 may include multiple sets. As an example, the first set 230 can include two subject area categories 240, which can, in turn, include two or more third sets 270. The sets 230, 250, and 270 can group information based on their content and relationship with other information.

The physical database 300 can include an operational hierarchy 310, which generally includes grouping of information in groups based on the content and relationship with other information within the group. The physical database 300 can include any number of groups. One desired physical database 300 can further include a first or business system group 320, a second or business transaction group 330, a third or interface component group 350, a fourth or interface structure group 380, and a fifth or interface attribute group 410. The first group 320 can include data characterizing one or more business systems, and the data can be segregated and labeled according to each business system 140 in the organization. The second group 330, which is a subset of the first group 320, can include data characterizing one or more business transactions or applications 150, and the data can be segregated and labeled according to each business transaction 150 in the respective business system 140. The third group 350, which is a subset of the second group 330, can include data characterizing one or more interface components 370, and the data can be segregated and labeled according to each interface component 370 in the respective business transaction 150. The fourth group 380, which is a subset of the third group 350, can include data characterizing one or more interface structures 400 and the data can be segregated and labeled according to each interface structure 400 in the respective interface component 370. The fifth group 410, which is a subset of the fourth group 380, can include data characterizing one or more interface attributes 420, which is a specific piece of data and generally can be a fact or value. Although only one or two business systems 140, business transactions 150, interface components 370, interface structures 400 or interface attributes 420 are depicted in groups 320, 330, 350, 380, and 410, it should be understood that the physical database 300 can include a vast number of business systems 140, business transactions 150, interface components 370, interface structures 400 or interface attributes 420 within each group. In addition, each business system 140, business transaction 150, interface component 370, and interface structure 400 can include vast numbers of respective groups 330, 350, 380, and 410. These groups 320, 330, 350, 380 and 410 can organize information based on their content and relationship with other information.

Although one of skill in the art will understand various methodologies for creating a database, one exemplary embodiment of creating the data model 205 can include identifying each business system 140 in an organization and its underlying information, e.g., data structures and system identifications, organizing this information into the second or business transaction group 330, the third or interface component group 350, the fourth or interface structure group 380, and the fifth or interface attribute group 410, and storing this information in the physical database 300.

Figure 3:
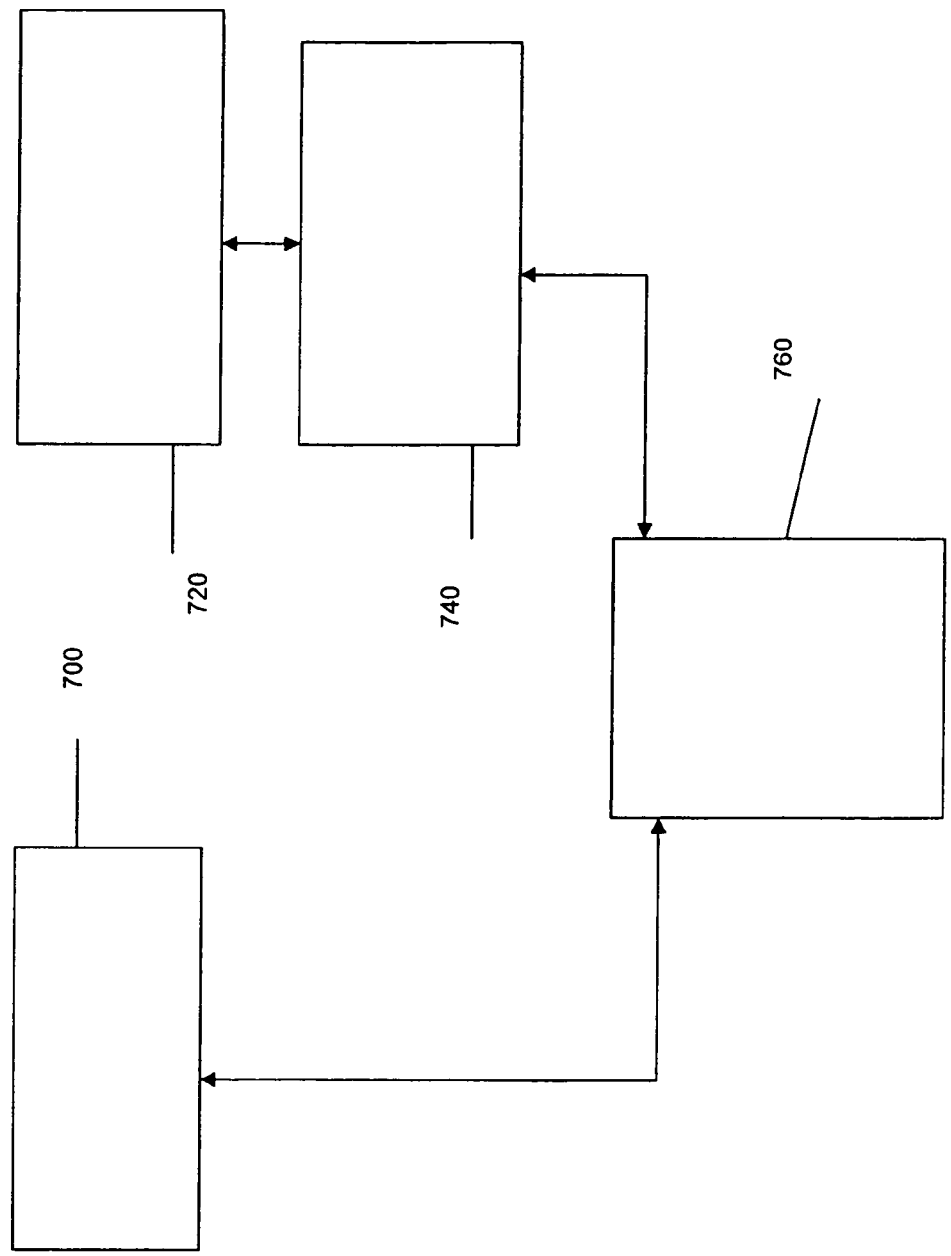
FIG. 3 is a schematic depiction of several exemplary paradigms that can be used to create a data model.

Particularly, several paradigms can be created, as depicted in FIG. 3. As an example, a corporate data paradigm 700 can provide a business-oriented, i.e., independent of technology and current systems, integrated view of data based on logical relationships that are desirable to the organization. The function paradigm 720 can provide a business-oriented, i.e., independent of technology and current systems, decomposition of the core business functions performed by the organization. The interaction paradigm 740 can provide what data is used, and categorize that use by specific commands, e.g. Create, Read, Update, or Delete (i.e., CRUD), by each of the business transactions 150 within the function paradigm 720. Generally, the business transactions 150 with similar data needs are typically implemented within the same business system 140. Thus, these business transactions 150 can be associated together with the business system 140 that utilizes them. A current systems paradigm 760 can provide an inventory of the current systems environment. As an example, data and process redundancy within the current business systems 140 are identified via matrices which "map" the current business systems 140 to information within the corporate data paradigm 700 and interfaces within the interactions paradigm 740.

Figure 4:
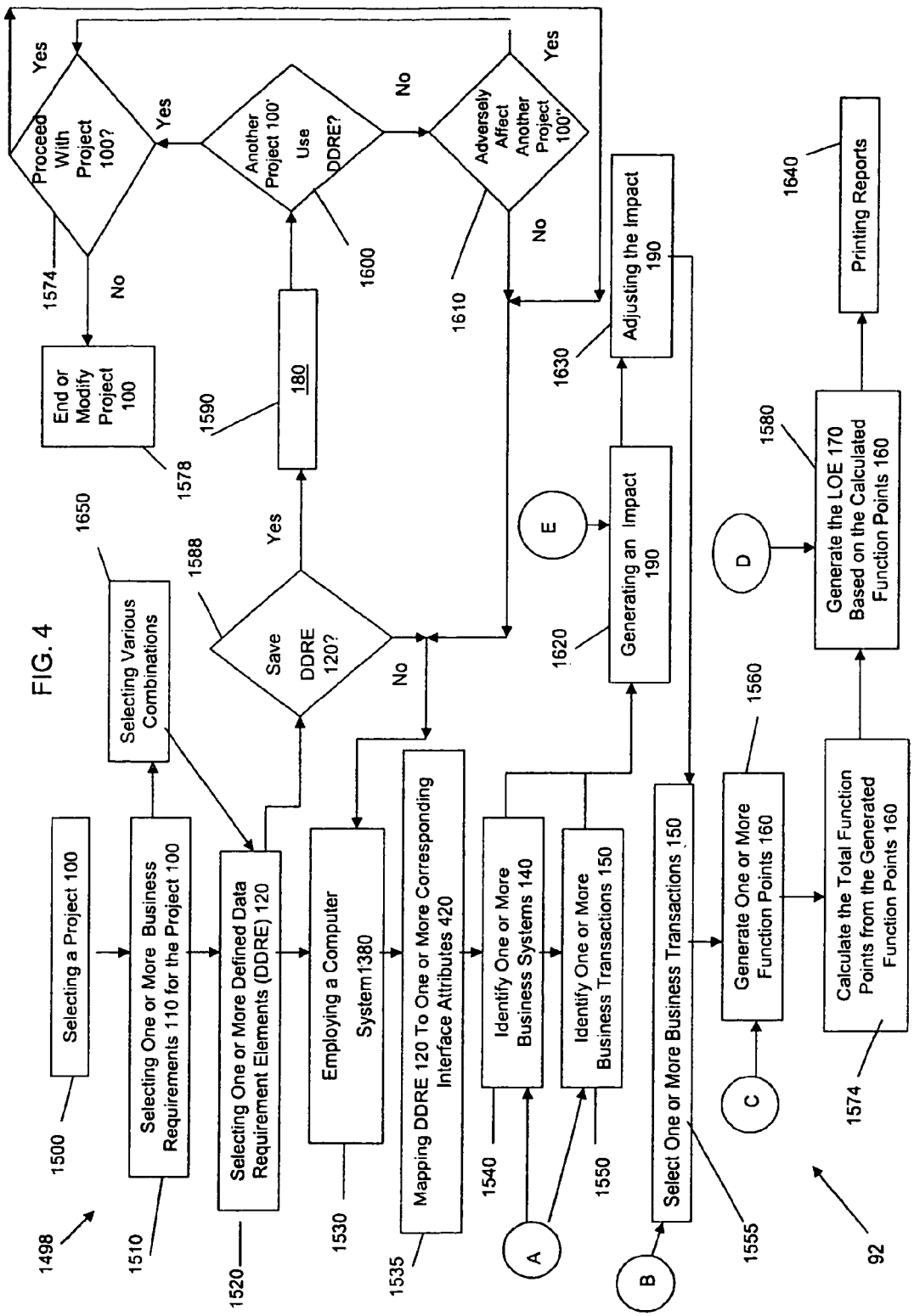
FIG. 4 is a block flow diagram of a mode of operation for generating a level of effort for one exemplary system.
Figure 5:
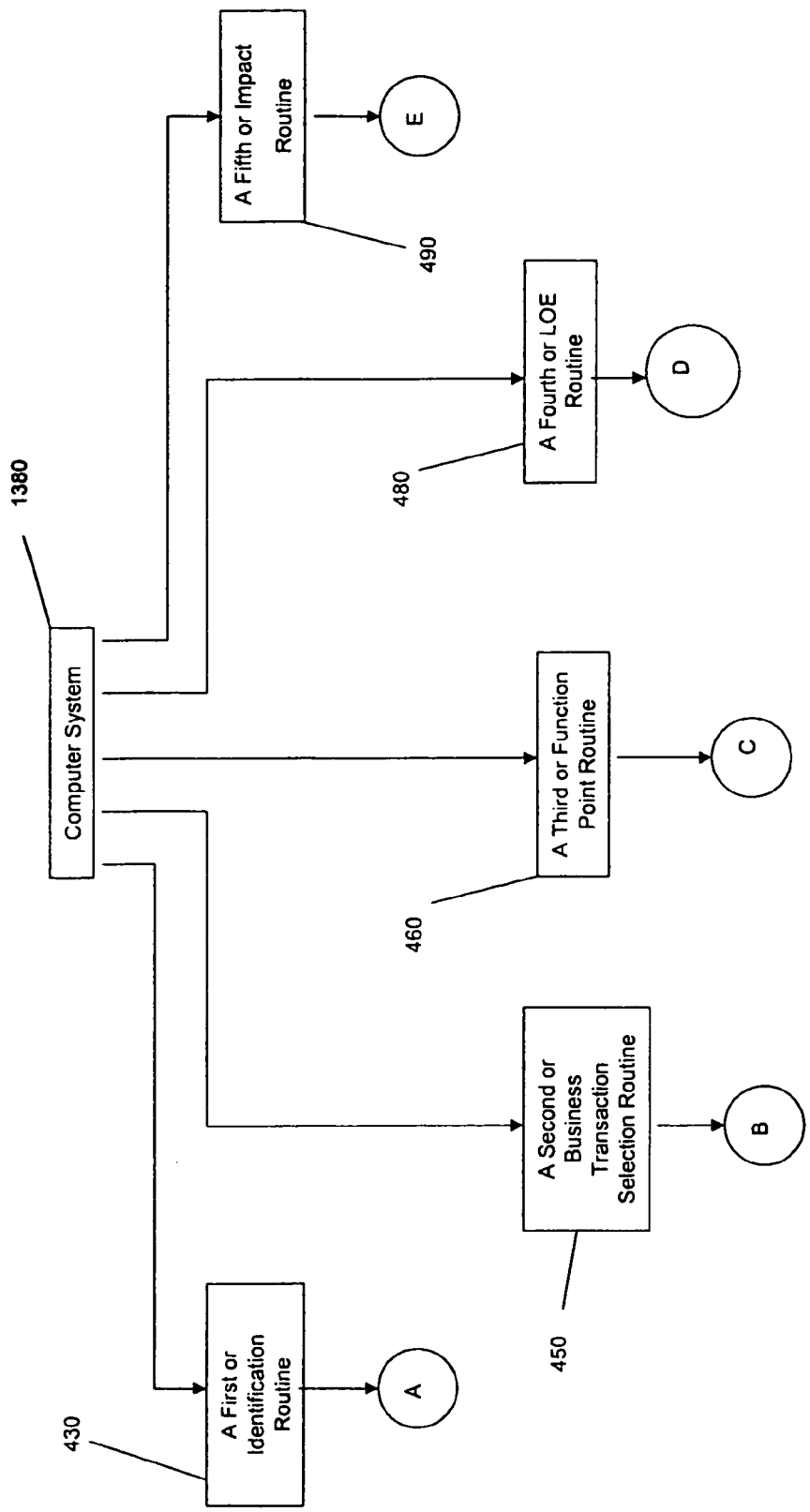
FIG. 5 is a schematic diagram of a computer system implementing one or more routines in an exemplary system.

Another exemplary mode of operation 1498 of the system 92 is depicted in FIGS. 4 and 5. In this mode, a user, such as a business sponsor, an account manager, a solutions architect, an enterprise information architecture architect, or a data architect, selects the project 100 for implementation at a block 1500. The project 100 can be selected from a directory on a computer, which can provide detailed information on the particulars, e.g. project supervisor, contact information, and deadlines, of the project 100. Next, the user selects one or more business requirements 110 for the project 100 at a block 1510. Again, the business requirements 110 can be depicted on a screen for selection by the user. Afterwards, one or more defined data requirement elements (DDRE) 120 can be selected by a user for each of the business requirements 110 at a block 1520. Optionally, a feature can be provided allowing a user to select various combinations of business requirements 110 for the project 100 at a block 1650 to generate a level of effort 170 for each combination of business requirements 110. This can aid a determination if a business requirement 110 is unduly costly, as discussed above.

That being done, the computer system 1380, hereinafter described, can be activated to analyze the selected DDRE 120 at a block 1530. Another optional feature can be inquiring whether to save the DDRE 120 at a diamond 1588. If not, the analysis can be conducted at the block 1530. If so, the DDRE 120 can be saved in a project data repository 180 at a block 1590. The information saved for the project 100 can include cost estimates, financing business group, and deadlines for completion. At this point, two additional queries can be made, namely whether the project 100 uses some or the same DDRE 120 as another project 100' at a diamond 1600 or whether the project 100 adversely affects another project 100" at a diamond 1610. If either query is in the affirmative, the user can evaluate whether to continue with the project 100 in view of the synergy or adversity at a diamond 1574. If so, the user can proceed to employ the computer system 1380. Otherwise, the user can end or modify the project 100 at the block 1578. In this manner, the user can identify synergies with other projects at the diamond 1600 by determining whether another project 100' is utilizing at least some of the DDRE 120, and thus potentially provide acceptable solutions to the business requirements 110 to be completed. Also, by comparing the project 100 with other projects saved in the project data repository 180, a user can determine whether delaying the implementation of the present project 100 would be beneficial so as to utilize solutions from this other project 100', as discussed above. Additionally, the user can determine if the present project 100 is adverse to another project 100", and decide whether to proceed, as discussed above. If the diamonds 1600 and 1610 are negative, then the computer system 1380 can be employed.

Referring to FIG. 5, the computer system 1380 can utilize a first or identification routine 430 to identify business systems 140 and business transactions 150 by utilizing the data model 205. Referring to FIGS. 2 and 4, the user may select one or more defined data requirement elements 120, which can be the most basic data-type in the consolidated logical database 210. The user can be guided to these selections by digging down through hierarchal tiers to identify the DDRE 120 for each business requirement 110. Once selected, the computer system 1380 may utilize a mapping function to find corresponding interface attributes 420 in the physical database 300 at a block 1535. This mapping function is schematically illustrated in FIG. 2 by the dashed arrow line. Thus, the DDRE 120 may provide a unique identifier for one or more interface attributes 420 throughout an organization.

As an example, different business groups and systems 140 in an organization may use the same data, but may refer to that data by different names. Accordingly, a data value may be referred to as a "credit score" by one business group, a "credit identification" by another business group, and a "credit class" by yet a third business group. The present system may provide a unique identifier, such as a "credit class code", which is a defined data requirement element 120, selected by a user for a given business requirement 110.

Employing the computer system 1380 maps the "credit class code" to corresponding interface attributes 420 in the physical database 300. In this example, the corresponding interface attributes 420 are credit score, credit identification, and credit class. This unique identifier can not only aiding mapping, but can aid the orientation of new employees and provide a tool to simplify the characterization of data by different business groups in an organization, as discussed above.

That being done, the computer system 1380 identifies one or more business systems 140 at a block 1540 and one or more business transactions 150 at a block 1550 that can utilize these interface attributes 420. This is illustrated schematically in FIG. 2 by the business system 140 and business transaction 150 containing the mapped interface attribute 420. Optionally, other information in the physical database 300 can be identified, such as one or more interface components 370, one or more interface structures 400, and one or more interface attributes 420. In one desired embodiment, the user can be presented not initially with the corresponding interface attributes 420, but the business systems 140 utilizing these interface attributes 420. Desirably, the user then can use a menu tree displayed on a graphic user interface to go from the business systems 140, to the business transactions 150, to the interface components 370, to the interface structures 400, and then ultimately to the interface attributes 420, if desired.

Once the one or more business systems 140 and/or one or more business transactions 150 are identified, the computer system 1380 can utilize a fifth or impact routine 490 to generate an impact 190 for each of the identified business systems 140 and/or business transactions 150 at a block 1620. The business system 140 or business transaction 150 may involve system inputs, outputs and/or entity manipulation within the organization. Generally, these impact classifications are based on the level of complexity in terms of number of interface attributes 420 involved. The computer system 1380 can perform a CRUD analysis, e.g. determining if a business transaction 150 creates, reads, updates or deletes data, and list all business transactions 150 along with their complexity and optionally CRUD type. Similarly, the computer system 1380 can characterize the business systems 140 incorporating these business transactions 150 with a CRUD type as well. As an example, if a business system 140 incorporates a business transaction 150 that creates data, then the business system 140 can be labeled as creating data too.

Desirably, once the business system 140 and/or the business transaction 150 are characterized with their CRUD type, an impact 190 can be adjusted by the user based on, e.g. their work experience, at a block 1630. As an example, a user's experience with a particular business transaction 150 may result in a conclusion that the implementation of the project 100 would have little impact on the business transaction 150. Thus, the user can alter the CRUD type to reflect this knowledge. If a business system 140 is altered, optionally all underlying one or more business transactions 150 can be accorded the same altered impact 190 as the business system 140.

Once each impact 190 is established, a second routine 450 can be executed for selecting one or more business transactions 150 that utilize the corresponding interface attributes 420 at a block 1555. Once these business transactions 150 are selected, a third or function point routine 460 can be executed for generating one or more function points 160 at a block 1560. Various methodologies are known to those of skill in the art to generate one or more function points 160 from one or more business transactions 150. Definitions of function points and procedures for manually counting function points are given in numerous documents. According to standard nomenclature, function points can include transaction function types and data function types. Transaction function types can include external inputs, external outputs, and external queries. Data function types can include internal logical files and external interface files. One exemplary approach may use an empirically established and refined multiplier table. The total function point count may therefore be obtained by the sum of multiplication of number of transactions of each complexity and CRUD type with respective multipliers at a block 1574. Optionally, the function point count may be multiplied by factors to account for technical challenges of the activity, to give a function point index. Generally, the function point counts are associated with a cost value either in dollars or hours of effort based on a supplier organization cost structure. An exemplary method for generating and calculating function points is disclosed in the patent applications incorporated herein by reference above.

A fourth or LOE routine 480 may be utilized to generate a LOE 170 expressed in at least one of money and man-hours based on the calculated function points 160 at a block 1580. One of skill in the art would recognize various formulations to generate the LOE 170 from the total calculated function points 160. One exemplary method for generating an LOE is disclosed in the patent applications incorporated herein by reference above. Afterwards, reports of cost, such as man-hours or money, synergy, and adversity can be generated and/or printed at a block 1640.

Referring to FIGS. 1, 2, 4 and 6-16, one exemplary application according to a system 94 can be conducted with an industry standard architectural model or process model, such as the enhanced telecom operations map (eTOM) utilized, e.g., in the telecommunications industry, which may be employed to identify and articulate appropriate levels of detail. The eTOM telecom framework may be created inside an application, e.g. an IRWIN tool, with a graphic user interface (GUI), e.g. VISUAL BASIC software. Although the eTOM framework is utilized in this exemplary application, it should be understood that other frameworks can also be utilized, particularly those that permit the hierarchical organization of information in the consolidated logical data base 210.

Figure 6:
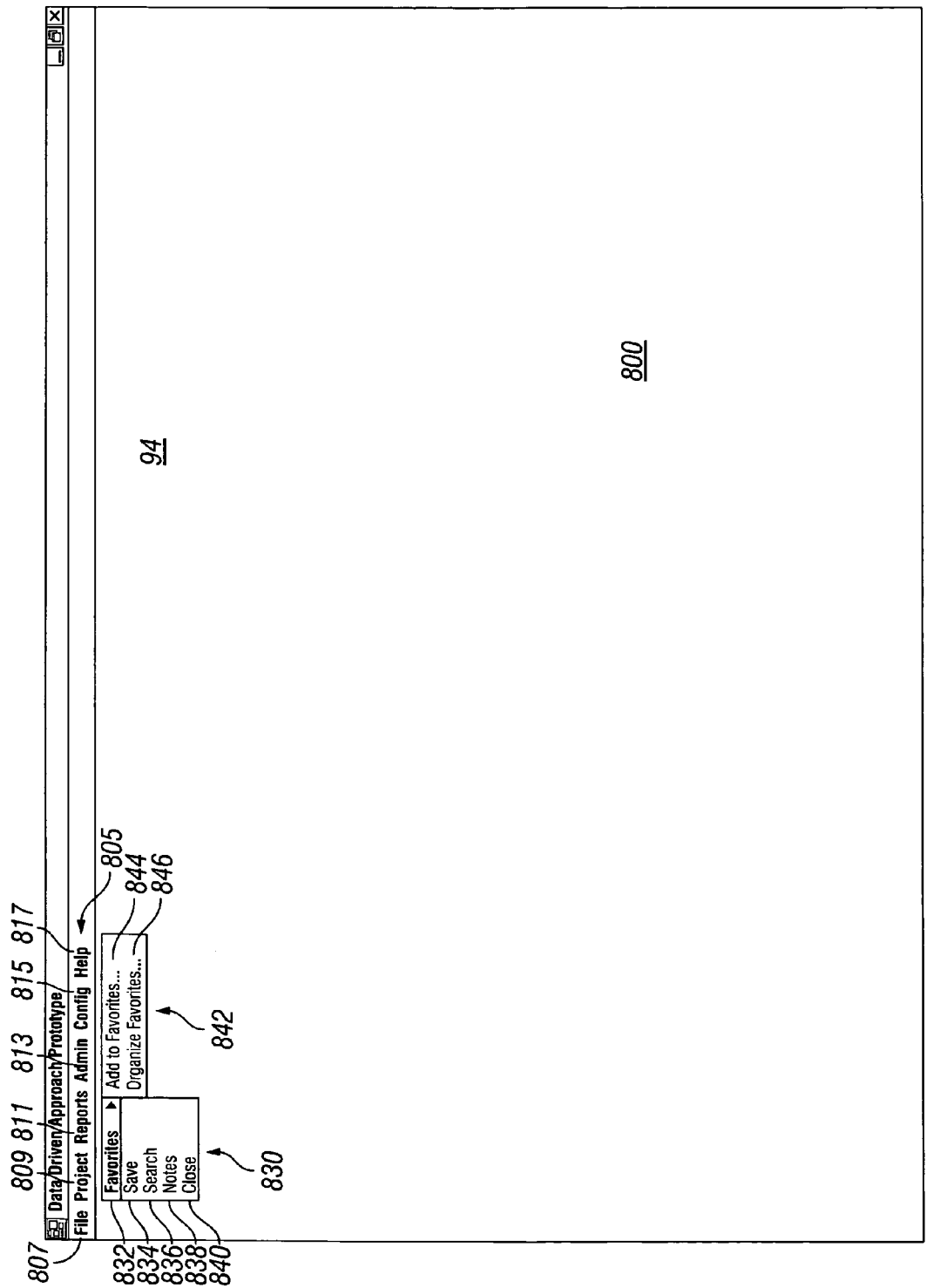

In an exemplary application, a user can open an initial screen 800 on a computer display. Referring to FIG. 6, this screen 800 can present information with a GUI, generally similar to a WINDOWS operating system, with menus and sub-menus. A menu 805 can provide several selections, e.g. File 807, Project 809, Reports 811, Administration 813, Configuration 815, and Help 817, for a user to select, which in turn can provide several more options. The selection Configuration 815 provides the ability to select the viewing preferences for the output of the analysis, which will be described in more detail hereinafter. The selection File 807 may provide a submenu to exit the application. Also, selecting Project 809 can reveal a project submenu 830 that provides several selections, such as Favorites 832, Save 834, Search 836, Notes 838, and Close 840. Selecting Favorites 832 can yield a further favorite submenu 842, such as Add to Favorites 844 and Organize Favorites 846. The selection Favorites 832 is generally where the most recently used projects 100 can be saved and retrieved without having to perform another lookup. The selection Add Favorites 844 may allow adding a new project 100 to a lookup list, as well as the individual business requirements 110 that have recently been saved. The selection Save 834 can provide the ability to save any information about the project 100 that has been created in the application to a database. The selection Search 836 may provide the ability to enter a number associated with the project 100 and perform a retrieval of information associated with that project 100. The selection Notes 838 can provide the ability to enter any notes about the project 100 and save them to the database. The selection Close 840 may provide the ability to close this project 100 in the application.

Figure 7:
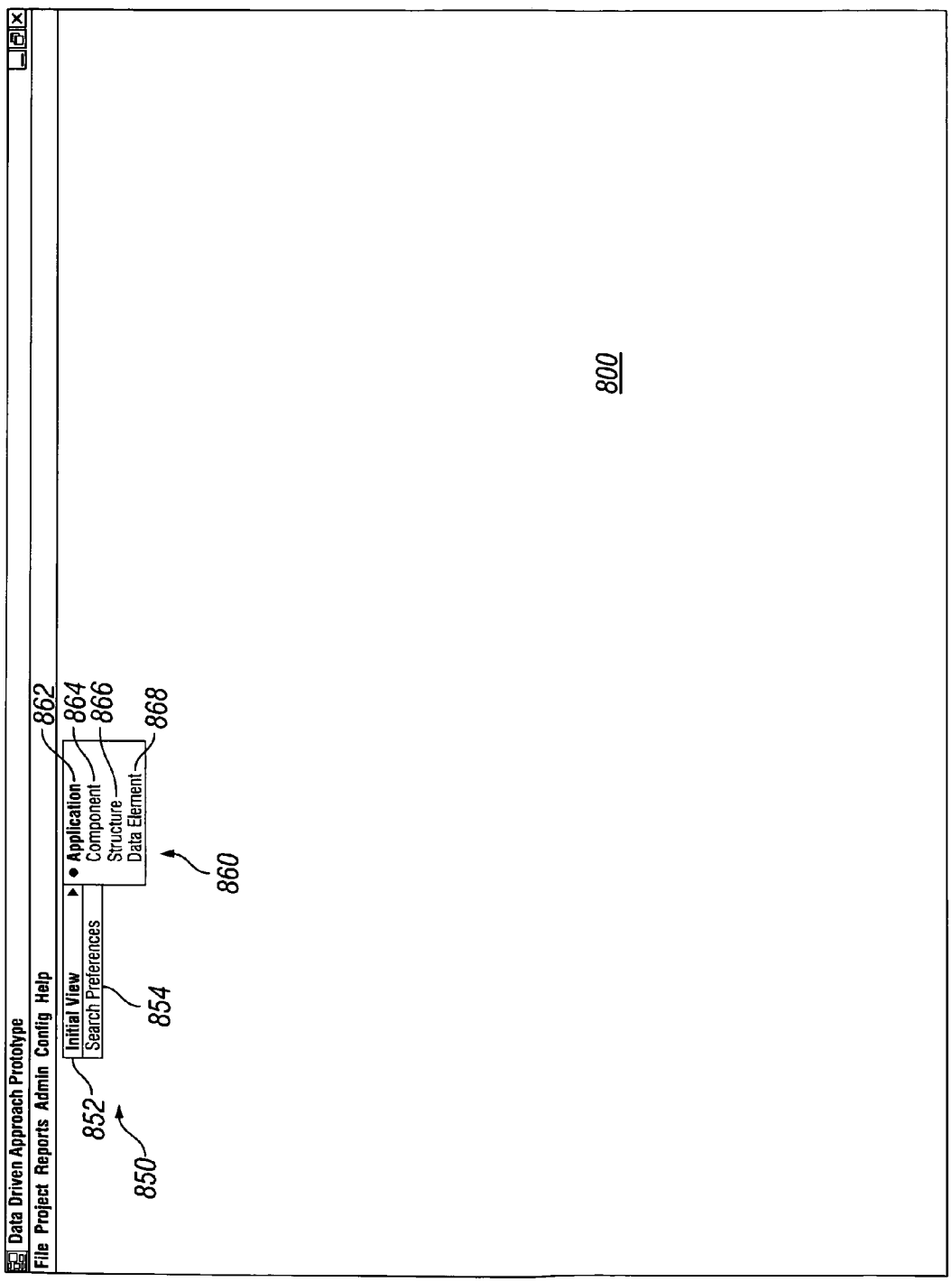

Referring to FIG. 7, a config submenu 850 can include selections, such as an Initial View 852 and Search Preferences 854. A further initial view submenu 860 can include selections, such as an Application or business transaction 862, Component 864, Structure 866, and Data Element or interface attribute 868, to specify a view for each type of information. As an example, selecting Search 836 generally opens a project search dialog box. Entering a number associated with the project 100 and selecting "OK" may retrieve information associated with that project 100.

Referring to FIG. 8, the application can retrieve information related to the project 100 from the database and display it back on the screen 800. The upper part of the screen 800 can display data 872 related to the project 100, such as a unique identifier number and descriptive name/title, funding business unit, fiscal status, information technology working status, project status, business status, customer want date, and project release date. Desirably, either the customer want date or project release date is provided to aid an impact analysis, as discussed in more detail hereinafter. Moreover, the screen 800 can include a title bar at the top of the screen 800 depicting the unique identifier number so a user can know what project 100 is currently active within the application.

The screen 800 can also include a Project Requirements tab 928, and may provide a user the ability to manage and assign business requirements 110 to various options 874. The middle part of the screen 800 can display project business requirements 110. Thus, not only are the business requirements 110 provided with text descriptions, but also in a directory 932, for selection by a user. Generally, the options 874 are activated once a business requirement 110 is selected.

Buttons 936 may permit a user to add, create, delete and save business requirements 110 to the project 100. As example, highlighting one of the business requirements 110 from the directory 932 and selecting the Add button 940 can place that requirement 110 in the lower part 942 of the screen 800. This procedure can be repeated to add more business requirements 110.

The button New 944 may provide the ability to add a new business requirement 110 to the lower part 942 if it is not listed in the directory 932. Thus, new business requirements 110 that are not in the directory 932 can be entered and stored in the database. As an example, selecting New 944 can open a new requirement dialog box, where the user can add the new business requirement 110. Moreover, the text of an added or new business requirement 110 appearing in the lower part 942 can also be edited by clicking on the requirement 110 and editing the text.

The Delete button 946 can provide the ability to delete a business requirement 110 from the lower part 942 if desired. Desirably, this does not delete the business requirement 110 from the directory 932 or the database, and moreover, the business requirements 110 can only be deleted one-at-a-time. The Save button 948 may provide the ability to save the business requirements 110, whether new or edited, from the lower part 942 to the database. Generally, saving the information is required in order to move to the next screen.

Also a feature can allow the capability to assign each business requirement 110 at the lower part 942 to one or more options 874. Sometimes, a business group will request multiple options 874 for the project 100 to better understand if one or more business requirements contribute more than their proportion of cost to the project 100. Moreover, the business group may also desire to get a LOE 170 and an impact 190 on a single business requirement 110 so that a return on investment can be determined and a decision made on whether to include that business requirement 110 in the project 100. In the depicted example, an option A 950 can be selected for all requirements except BR21 and an option B 952 can be selected for BR21 only. Once the business requirements 110 have been edited and/or managed, they can be saved, as discussed above.

Figure 9:
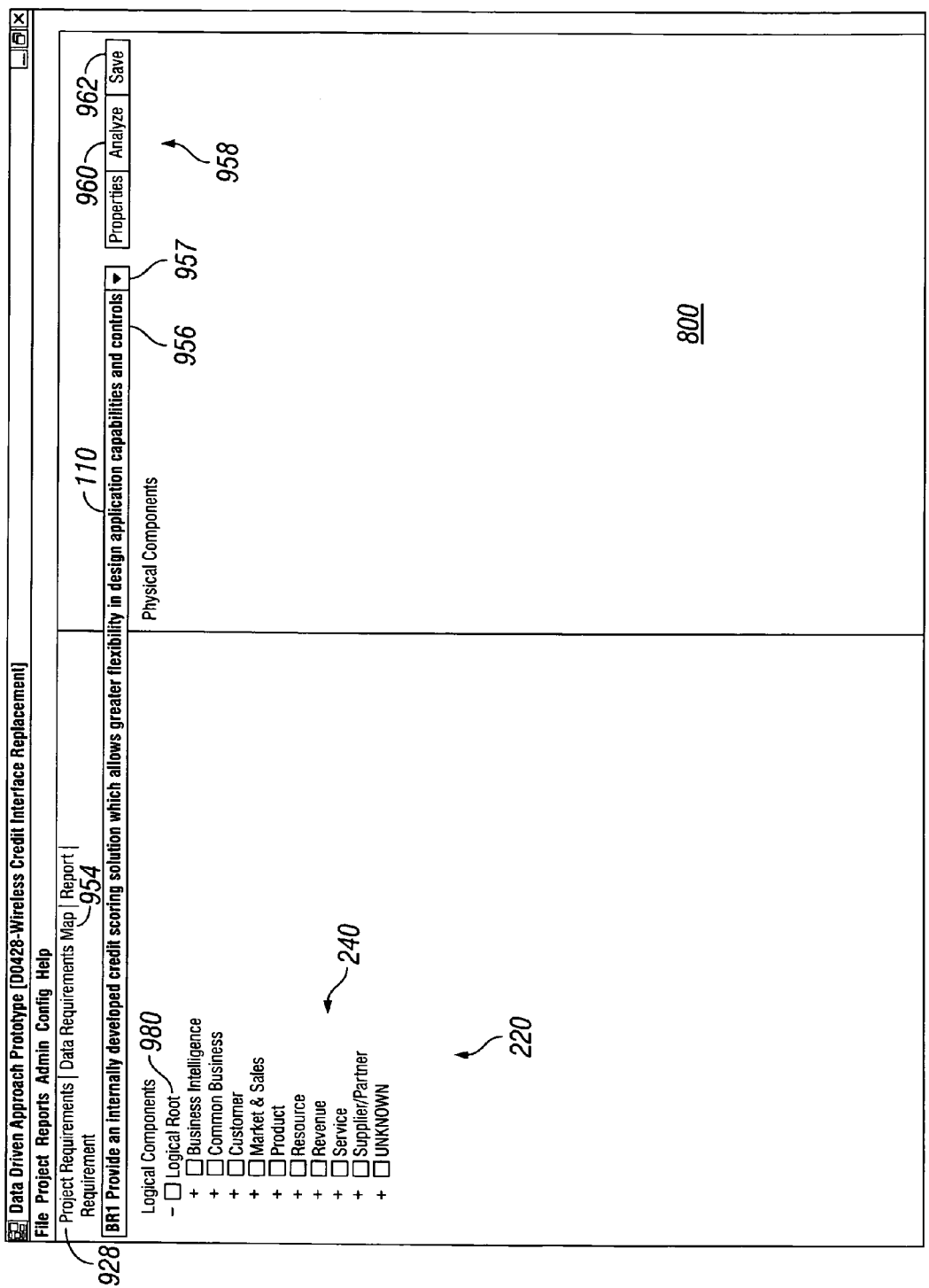
Figure 10:
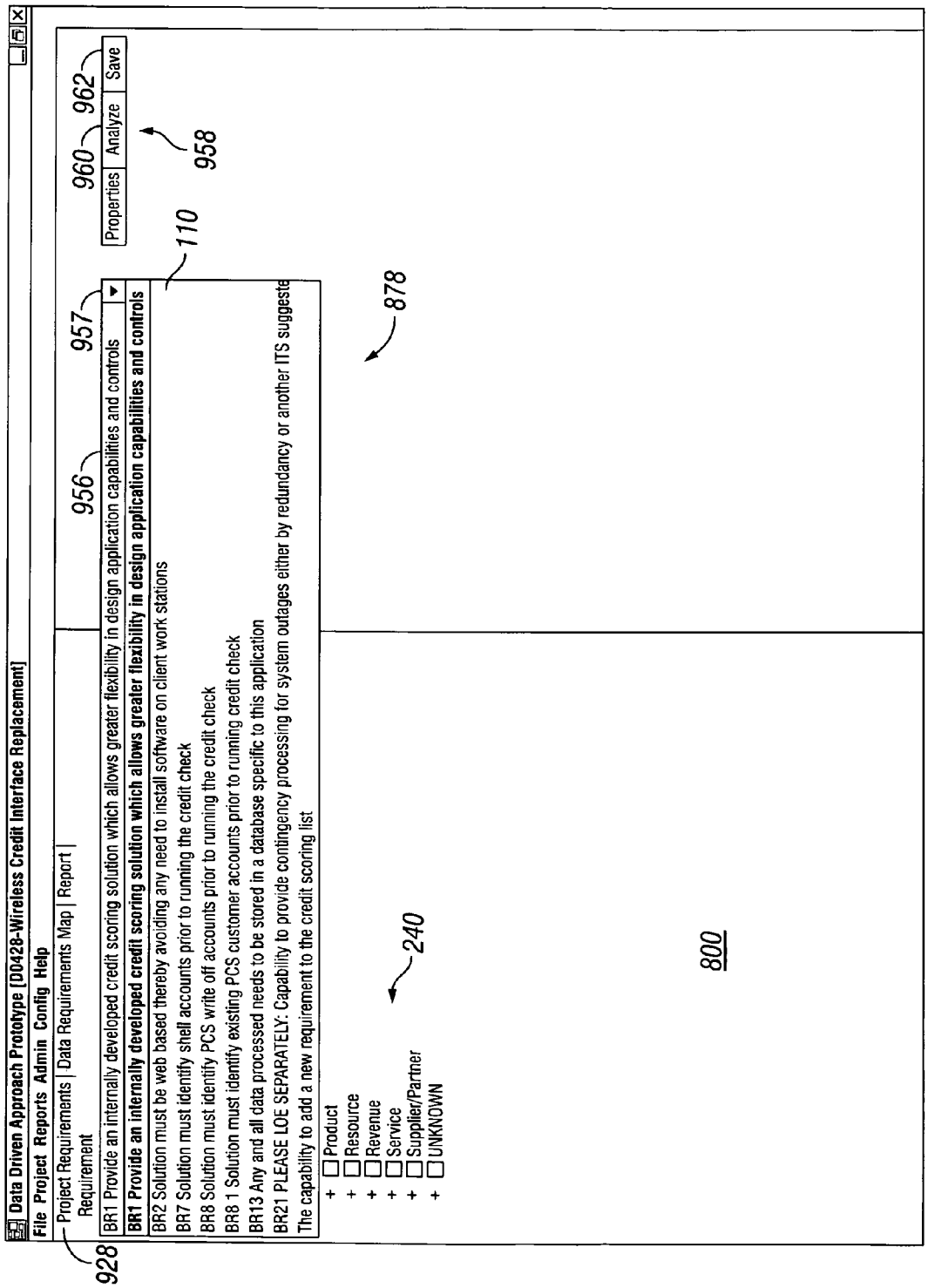

Referring to FIGS. 9-10, the selection of defined data requirement elements 120 for a business requirement 110 can be conducted. A user can begin by selecting, the tab Data Requirements Map 954. Desirably, the business requirements 110 that were defined and saved in the tab Project Requirements 928 are generally available from a drop down arrow box 956. Clicking on an arrow 957 can reveal the list of business requirements 110. One or more defined data requirement elements 120 that are desired to implement the business requirement 110 can be selected for mapping. Also buttons 958, including a button Analyze 960 that allows the processing of the business requirement 110 once the one or more defined data requirement elements 120 are selected as discussed hereinafter, may be provided. The Save button 962 may allow the ability to save the completed work to the database for later retrieval.

The left hand side of the screen 800 may contain the information domain hierarchy 220 starting at the eTOM Information Domain or Logical Root 980, then the subject area categories 240, then the entity categories 260, and then the defined data requirement elements 120. As an example, from a requirement directory 878, the business requirement BR1 can be selected for processing.

Figure 11:
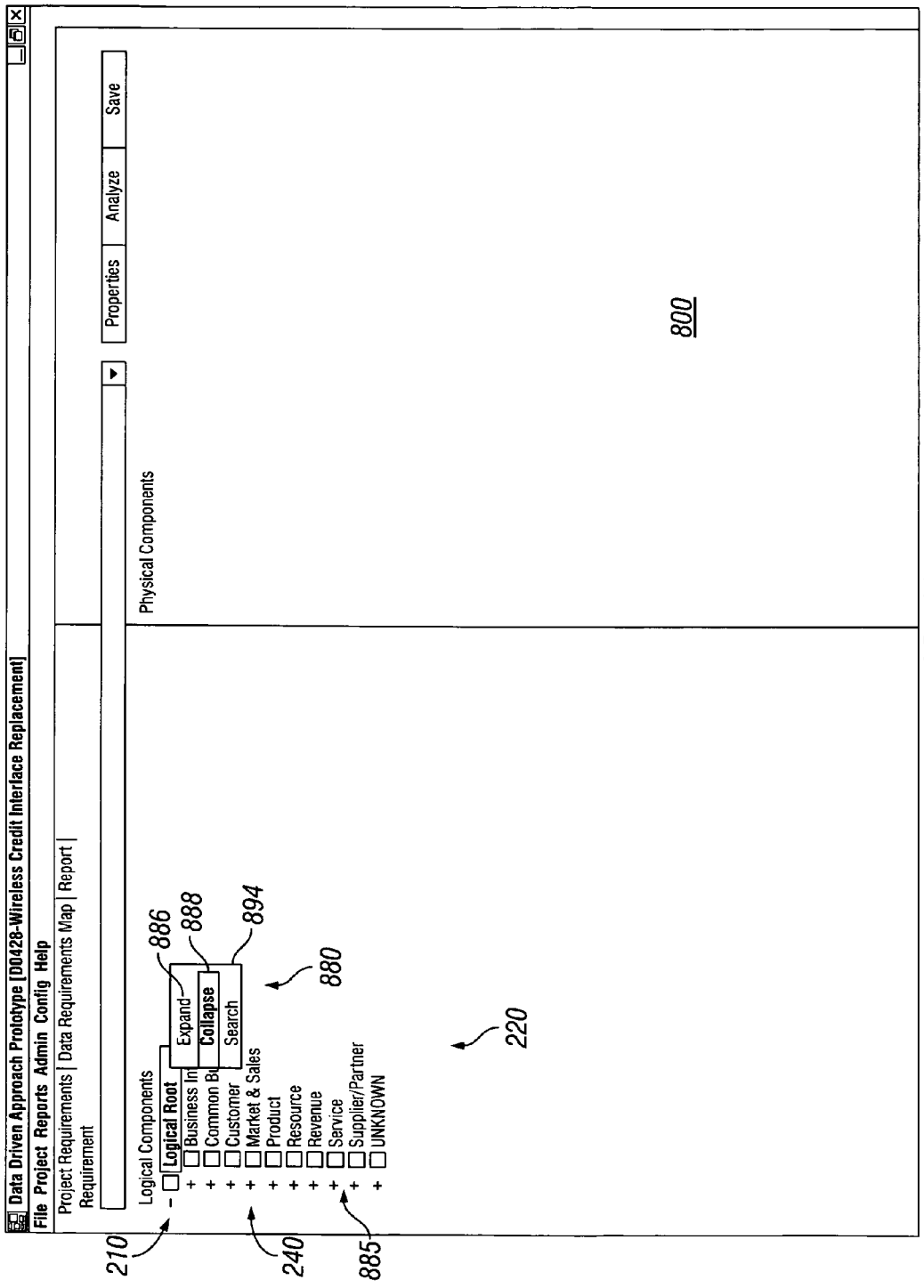
Figure 12:
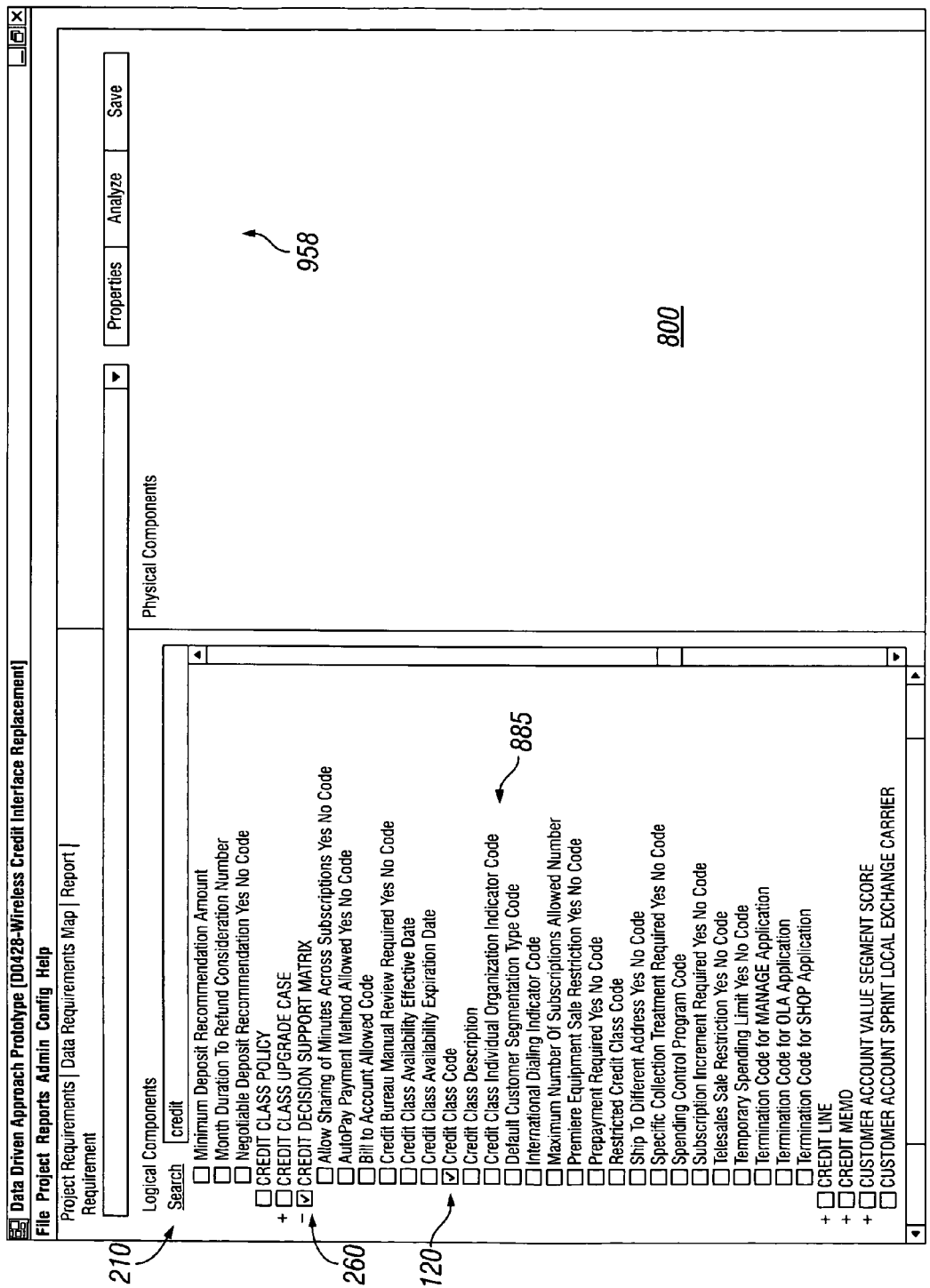

Referring to FIGS. 11 and 12, to aid in the selection of the defined data requirement elements 120 required to implement the business requirement 110, the information domain hierarchy 220 can be expressed as a logical component tree 885 with the logical component tree dialog box 880. As an example, the "tree" can be expanded or collapsed by right clicking with a mouse on the "Logical Root" and selecting Expand 886 or Collapse 888. Alternatively, a search functionality may also be provided with the logical component tree dialog box 880. As an example, a search can be performed by right clicking with a mouse on the "Logical Root" and selecting Search 894. The word 'credit' can be searched by typing the word in a search dialog box and either clicking on the word "search" or enter.

Referring to FIG. 12, after conducting the search, the left side of the screen 800 is now expanded to show all the various uses of the word 'credit', which can optionally be highlighted with a color, e.g., green, in the consolidated logical database 210. Desirably, the total number of matches of the word 'credit' can be added at the bottom of the screen 800.

Figure 13:
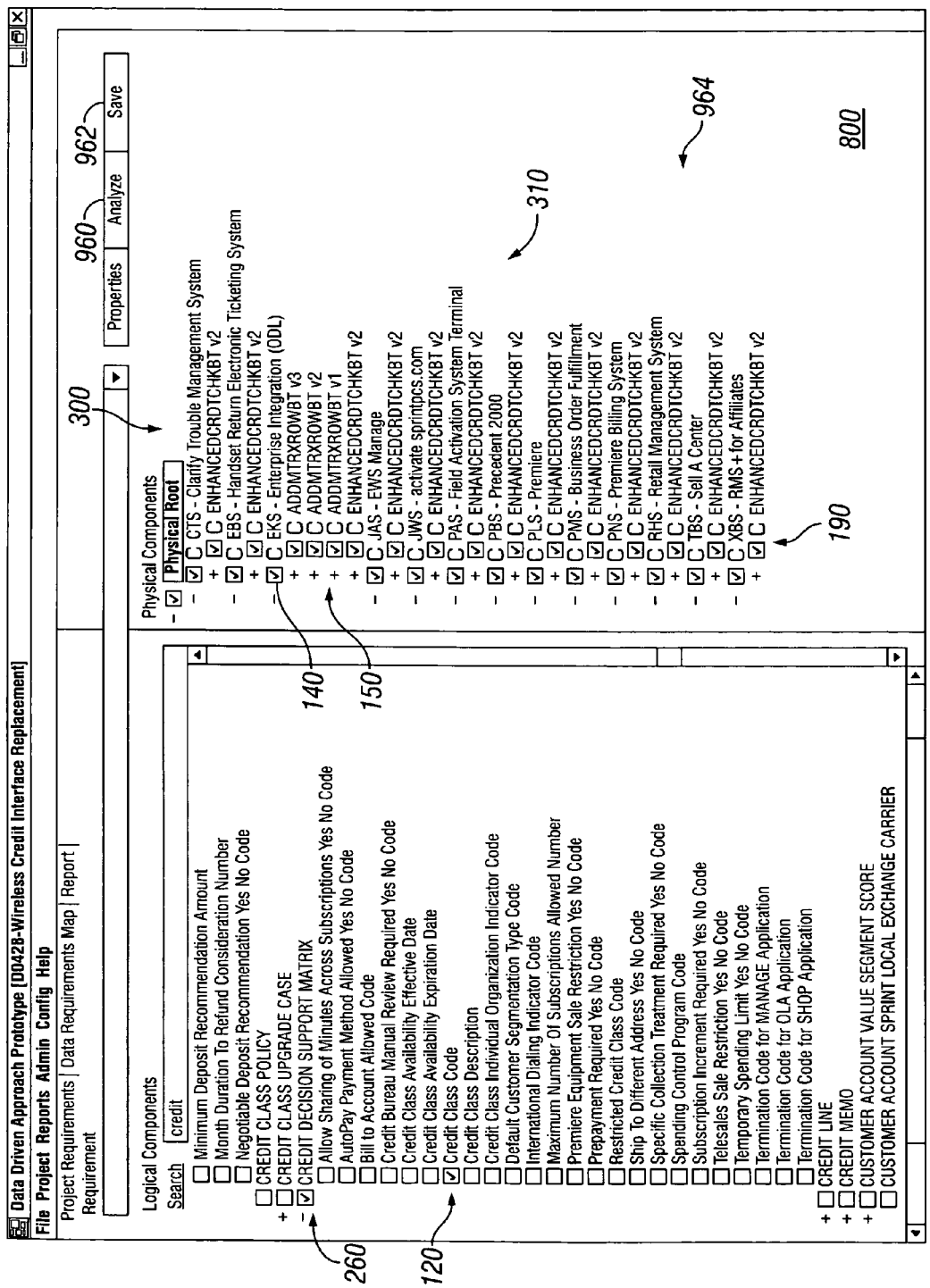

Referring to FIG. 13, a user can select a specific defined data requirement element 120 from the screen 800. Desirably, a user will have knowledge of the main goal of the business requirement 110. In this example, the main goal of the business requirement 110 is to bring in a new credit checking/scoring system, so the defined data requirement element Credit Class Code 120 is selected from the entity category Credit Decision Support Matrix Entity 260. Each matched defined data requirement element 120 on credit should be reviewed to ensure that none are overlooked.

Next, the analyze button 960 may be selected to reveal one or more business systems 140, which utilize the defined data requirement element 120, on the right side of the screen 800. The physical database 300 may be arranged in an operational hierarchy 310, namely clicking on the "plus" symbol can yield more detailed information regarding use of the defined data requirement element 120. In other words, the physical database 300 is also arranged in a logical component tree 964. As an example, clicking on the "plus" next to the EKS Enterprise Integration system 140 reveals business transactions 150 that are potentially impacted by the selected defined data requirement element 120 (credit class code). As depicted in this exemplary embodiment, the business transactions 150 impacted by this business requirement 110 are:

ADDMTRXROWBT v1
ADDMTRXROWBT v2
ADDMTRXROWBT v3
ENHANCEDCRDTCHKBT v2

Optionally, input can be sought from business sponsors, the account managers, the solutions architects, enterprise information architecture architects, and data architects on the impact 190 that the project 100 will have on existing business systems 140. As an example, will each business transaction 150 need to change code in view of the project 100 or will the business transaction 150 need to be moved into a new business system 140? Optionally, at this point the information can be saved by selecting the button Save 962.

Figure 14:
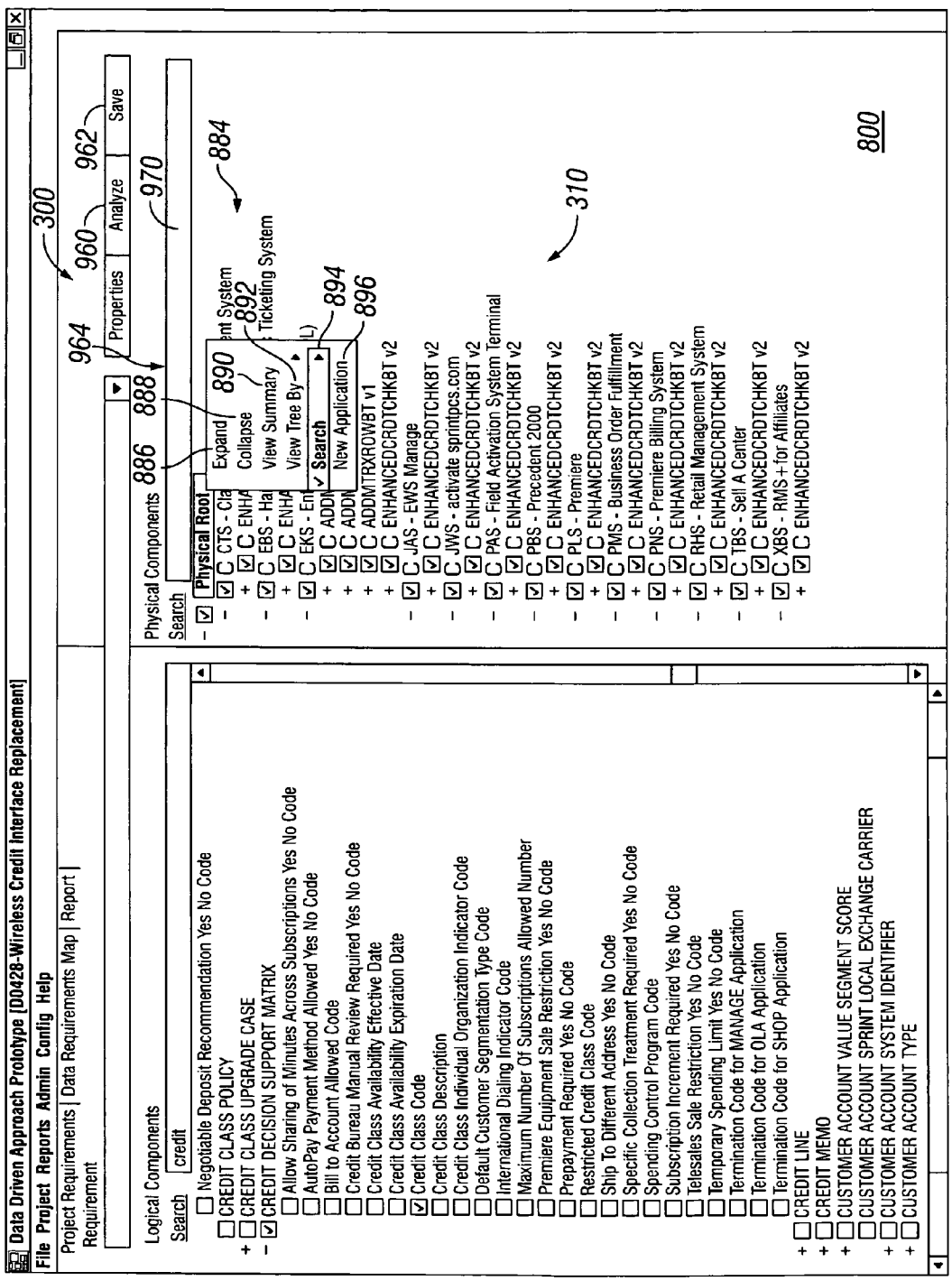

Referring to FIG. 14, more detail can be provided on the logical component tree 964. As an example, selecting the "Physical Root" and right clicking a mouse button reveals a physical root submenu 884, which includes selections such as Expand 886, Collapse 888, View Summary 890, View by Tree 892, Search 894, and New Application 896. The selections Expand 886 and Collapse 888 can allow the capability to expand or collapse all nodes in the list. The logical component tree 964 can enable the selection of a view of one or more business systems 140, one or more business transactions 150, one or more interface components 370, one or more interface structures 400, and one or more interface attributes 420. The selection New Application 896 can also allow the entry of a new business transaction 150.

Selecting Search 894 from the physical root submenu 884 opens a search text box 970. This feature provides a user the ability to search the operational hierarchy 310. As an example, typing the word or words to locate, and hitting enter or selecting the "Search" prompt, can result in that selection being highlighted, e.g. in green, on the screen 800.

Figure 15:
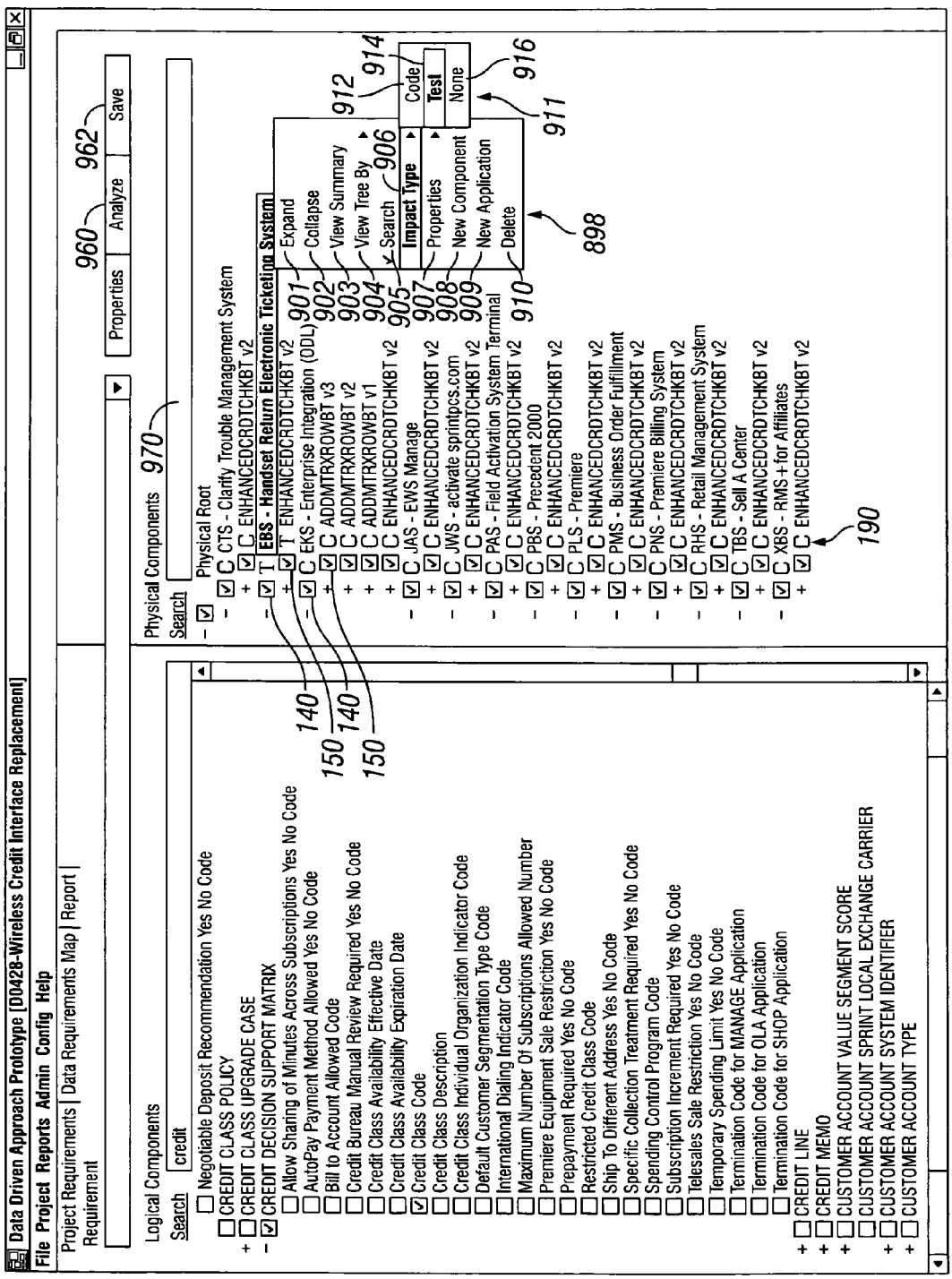

Referring to FIG. 15, highlighting the business system 140 and right clicking on a mouse button can reveal a business system submenu 898. The business system submenu 898 can include the selections Expand 901, Collapse 902, View Summary 903, View by Tree 904, Search 905, Impact Type 906, Properties 907, New Component 908, New Application 909, and Delete 910. The selections Expand 901 and Collapse 902 may allow the capability to expand or collapse all nodes in the list. The selection View by Tree 904 can provide a submenu to select which view is available in the list by the business transaction 150, the interface component 370, the interface structure 400, and the interface attribute 420. Thus this selection can provide the same information with a different display. Selecting Search 905 can open the search text box 970 and operate similarly as the Search 894 function in the physical root submenu 884.

In addition, the exemplary system not only can identify the one or more business systems 140 and one or more business transactions 150 utilizing the defined data requirement element 120, but may also generate an impact 190 on the business system 140 and business transaction 150. As an example, the computer system 1380 can generate a CRUD analysis for each identified business system 140 and business transaction 150, and display such results on the screen 800. As an example, each business system 140 and business transaction 150 can be marked, e.g. in red, with a 'C', which can indicate that they are 'Code' impacted, or with a "T" to indicate that they are "Test" impacted. Generally, a business system 140 or a business transaction 150 that conducts all four CRUD commands would be "Code" impacted, while a business transaction 150 that only conducts the "read" command would be "Test" impacted. However, these computer generated impacts of "Code" and "Test" can be created based on any predetermined amount of CRUD.

The impact 190 can be changed for any business system 140 or business transaction 150 in the business system submenu 898 by selecting the Impact Type 906 to open an impact type sub-menu 911. The impact type sub-menu 911 can provide selections of Code 912, Test 914 and None 916. Thus, a user can modify the computer generated impact 190 based on their experience. This functionality may allow the ability to change the impacts 190 as necessary to support the project 100, if, e.g. the business group may not have the budget to pay for some requisite changes or it may not be necessary for them to change.

The selection New Component 908 may allow the entry of a 'proposed' new business transaction 150 or version of an existing business transaction 150 if required by the project 100. Also, the selection New Application 909 can allow the ability to enter a new business system 140 if required by the project 100. Moreover, the selection Delete 910 may allow the ability to remove/retire a business transaction 150 or a business system 140 if required by the project 100.

The operation of an exemplary impact type sub-menu 911 can be illustrated. Initially, a user can highlight a business system 140 (E8S) and right click on a mouse button. This click opens the business system sub-menu 898. Highlighting the Impact Type 906 and right clicking on the mouse button opens the impact type sub-menu 911. The user can then click on Test 914 to change the impact 190 from Code 912 to Test 914. In this example, a 'C' for "Code", e.g. colored red, can be changed to a 'T' for "Test", e.g. colored blue, to visually indicate that it was determined that this business system 140 would require test support only on the project 100. Desirably, all business transactions 150 within this business system 140 would also change in impact from "Code" to "Test". Alternatively, the system can be configured so this change is made manually.

Figure 16:
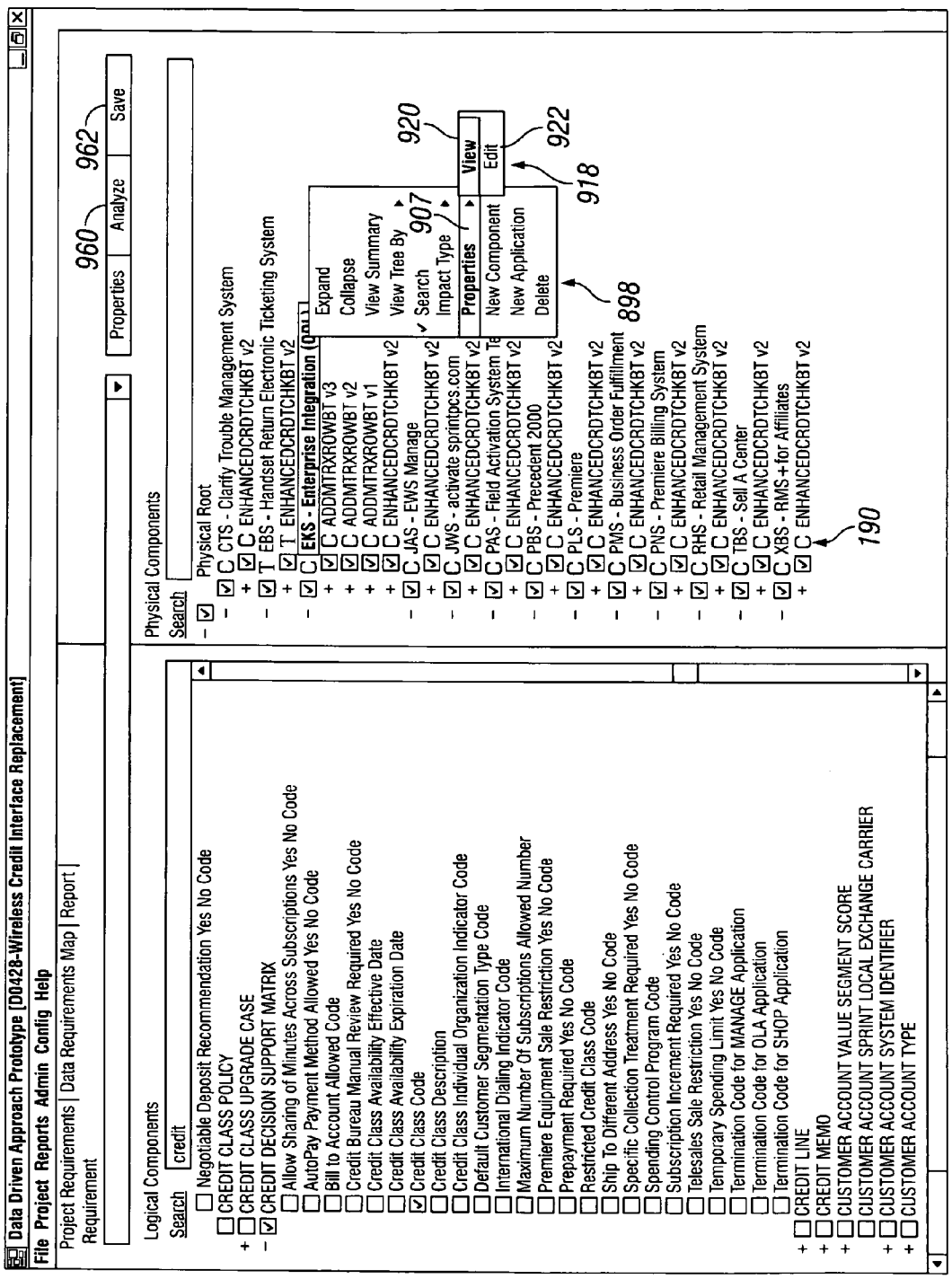

Referring to FIG. 16, the selection Properties 907 can provide metadata information about the item selected. As an example, highlighting Properties 907 and right clicking on a mouse button opens a properties sub-menu 918 with selections of View 920 and Edit 922. Selecting View 920 can open a component properties dialog box of a business system 140, which can reveal its type, e.g. application, its unique id within the database, and its version of the application. Moreover, additional information can be included such as its status, effective date and expiration date.

After all impacts 190 have been identified and selected, and all menu item functionality discussed, choosing the button Save 962 can make the reporting capabilities active. As an example, a report illustrating cost based on "artificial" function point parameters can be generated. This report can be developed by assigning a function point count to each business transaction 150 where development and test costs per function point 160 are assigned to each business system 140. Another exemplary report can be generated to depict dependencies of projects implemented before the current project 100 being evaluated. In addition, a further exemplary report can depict synergies of projects implemented after the current project 100. Thus, these reports can provide the user with desirable information regarding the project 100, as discussed above.

Figure 17:
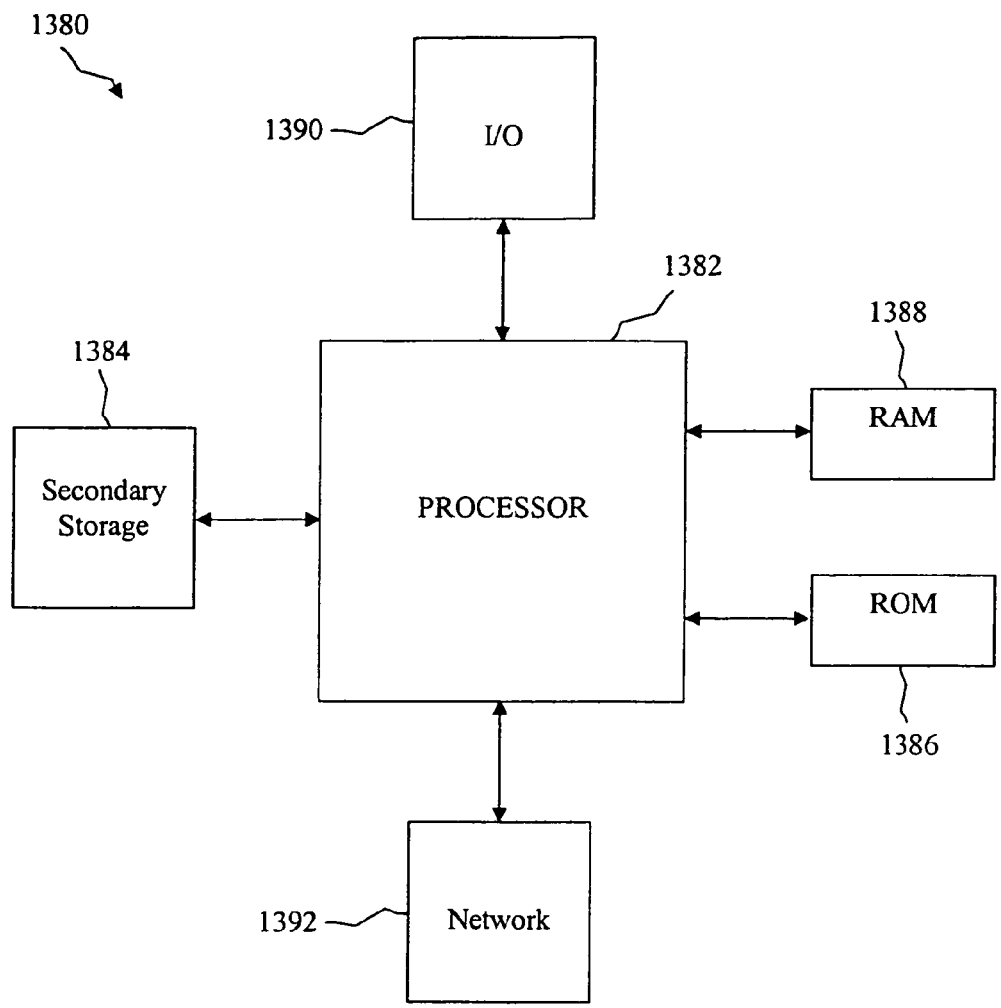
FIG. 17 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 17 illustrates a typical, general-purpose computer system suitable for implementing one or more embodiments disclosed herein. The computer system 1380 includes a processor 1382 (which may be referred to as a central processor unit or CPU) that is in communication with memory devices including the secondary storage 1384, read only memory (ROM) 1386, random access memory (RAM) 1388, input/output (I/O) devices 1390, and network connectivity devices 1392. The processor may be implemented as one or more CPU chips.

The secondary storage 1384 is typically comprised of one or more disk drives, CD or DVD burners, or tape drives and is used for non-volatile storage of data and as an over-flow data storage device if the RAM 1388 is not large enough to hold all working data. In some instances; the disk drives may be in a RAD configuration. The secondary storage 1384 may be used to store programs which are loaded into the RAM 1388 when such programs are selected for execution. The ROM 1386 is used to store instructions and perhaps data which are read during program execution. The ROM 1386 is a non-volatile memory device which typically has a small memory capacity relative to the larger memory capacity of secondary storage. The RAM 1388 is used to store volatile data and perhaps to store instructions. Access to both the ROM 1386 and RAM 1388 is typically faster than to secondary storage 1384.

The I/O devices 1390 may include printers, video monitors, liquid crystal displays (LCDs), touch screen displays, keyboards, keypads, switches, dials, mice, track balls, voice recognizers, card readers, paper tape readers, or other well-known input/output devices. The network connectivity devices 1392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1392 may enable the processor 1382 to communicate with an Internet or one or more intranets. With such a network connection, it is contemplated that the processor 1382 might receive information from the network, or might output information to the network in the course of performing the above-described method steps. Such information, which is often represented as a sequence of instructions to be executed using the processor 1382, may be received from and outputted to the network, for example, in the form of a computer data signal embodied in a carrier wave.

Such information, which may include data or instructions to be executed using the processor 1382 for example, may be received from and outputted to the network, for example, in the form of a computer data baseband signal or signal embodied in a carrier wave. The baseband signal or signal embodied in the carrier wave generated by the network connectivity devices 1392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1382 executes instructions, codes, computer programs, scripts which it accesses from hard disk, floppy disk, optical disk (these various disk based systems may all be considered secondary storage 1384), the ROM 1386, the RAM 1388, or the network connectivity devices 1392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for identifying at least one of a business transaction and a business system, comprising:
    receiving, by a computer system, selections of one or more defined data requirement elements for each of one or more business requirements of a development project for an organization;
    storing in a physical database, a hierarchy of groups of data comprising a first group of data that includes data that characterizes business systems of the organization, a second group of data that is a subset of the first group of data and includes data that characterizes business transactions of the organization, and a third group of data that is a subset of the second group of data and includes interface attributes;
    mapping, by a computer system, each of the selected one or more defined data requirement elements to a corresponding one or more interface attributes in the physical database, wherein each of the corresponding one or more interface attributes is a different identification of a data element as used by one or more of a plurality of groups within the organization, and wherein each of the selected one or more defined data requirement elements is a unique identifier of the data element that is associated with each of the different identifications of the data element as used by the plurality of groups throughout the organization;
    identifying, by a computer system, at least one of one or more of the business transactions and one or more of the business systems in the organization that use the corresponding one or more interface attributes based on the hierarchy of groups of data in the physical database, wherein each of the one or more business transactions comprises an operation on at least one of the corresponding one or more interface attributes, and wherein each of the one or more business systems comprises a system in the organization that has responsibility for at least one of the one or more business transactions.

2. A method according to claim 1, further comprising assigning each defined data requirement element to the corresponding one or more interface attributes.

3. A method according to claim 1, further comprising determining, by a computer system, whether another development project in the organization utilizes at least one of the one or more defined data requirement elements to one of eliminate redundancy and promote synergy.

4. A method according to claim 1, further comprising determining, by a computer system, whether the development project will adversely affect another development project in the organization.

5. A method according to claim 1, further comprising determining an impact the development project will have on at least one of the one or more business systems and one or more business transactions.

6. A method according to claim 1, further comprising selecting various combinations of business requirements and defined data requirement elements for the development project and identifying one or more business systems or one or more business transactions for each of the various combinations.

7. A system for identifying at least one of one or more business transactions and one or more business systems, comprising:
    a consolidated logical database, stored on a computer readable medium, and comprising an information domain hierarchy, comprising:
        a set comprising one or more defined data requirement elements;
    a physical database, comprising a hierarchy of groups of data including a first group of data that includes data that characterizes business systems of the organization, a second group of data that is a subset of the first group of data and includes data that characterizes business transactions of the organization, and a third group of data that is a subset of the second group of data and includes interface attributes;

a mapping function stored on a computer readable storage medium and executable by a computer to map each of a selected one or more defined data requirement elements from the set for a development project of an organization to a corresponding one or more interface attributes in the physical database, wherein each of the corresponding one or more interface attributes is a different identification of a data element as used by one or more of a plurality of groups within the organization, and wherein each of the selected one or more defined data requirement elements is a unique identifier of the data element that is associated with each of the different identifications of the data element as used by the plurality of groups throughout the organization; and an identification routine stored on a computer readable storage medium and executable by a computer to identify at least one or more of the business transactions and one or more of the business systems in the organization that use the corresponding one or more interface attributes based on the hierarchy of groups of data in the physical database, wherein each of the one or more business transactions comprises an operation on at least one of the corresponding one or more interface attributes, and wherein each of the one or more business systems comprises a system in the organization that has responsibility for at least one of the one or more business transactions.

8. A system according to claim 7, wherein the identification routine identifies the one or more of the business systems.

9. A system according to claim 7, wherein each defined data requirement element is assigned to the corresponding one or more interface attributes.

\* \* \* \* \*